US006734840B2

(12) United States Patent
Fukutoku et al.

(10) Patent No.: US 6,734,840 B2
(45) Date of Patent: May 11, 2004

(54) LIQUID CRYSTAL DISPLAY DEVICE WITH JUDGING SECTION

(75) Inventors: Syouichi Fukutoku, Kawasaki (JP); Kazuhiro Nukiyama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 187 days.

(21) Appl. No.: 09/735,136

(22) Filed: Dec. 12, 2000

(65) Prior Publication Data

US 2001/0004253 A1 Jun. 21, 2001

(30) Foreign Application Priority Data

Dec. 14, 1999 (JP) .......................................... 11-354206

(51) Int. Cl.[7] ............................ G09G 3/36; H04N 9/73

(52) U.S. Cl. ............................ 345/96; 345/98; 345/99; 348/226.1; 348/447

(58) Field of Search ............................ 345/99, 96, 98; 348/226, 447

(56) References Cited

U.S. PATENT DOCUMENTS

| | | | | | |
|---|---|---|---|---|---|
| 4,723,163 | A | * | 2/1988 | Skinner | 358/140 |
| 4,758,893 | A | * | 7/1988 | Lippel | 358/209 |
| 5,062,001 | A | * | 10/1991 | Farwell et al. | 358/236 |
| 5,956,014 | A | * | 9/1999 | Kuriyama et al. | 345/63 |
| 6,072,451 | A | * | 6/2000 | Mano et al. | 345/96 |
| 6,100,859 | A | * | 8/2000 | Kuriyama et al. | 345/60 |
| 6,130,723 | A | * | 10/2000 | Medin | 345/58 |
| 6,222,512 | B1 | * | 4/2001 | Tamjima et al. | 345/63 |
| 6,243,419 | B1 | * | 6/2001 | Satou et al. | 375/240.13 |
| 6,249,265 | B1 | * | 6/2001 | Tajima et al. | 345/89 |
| 6,496,172 | B1 | * | 12/2002 | Hirakata | 345/96 |

FOREIGN PATENT DOCUMENTS

| | | |
|---|---|---|
| JP | 62113129 | 5/1987 |
| JP | 02034818 | 2/1990 |
| JP | 05297831 | 11/1993 |
| JP | 06149174 | 5/1994 |
| JP | 07175448 | 7/1995 |
| JP | 08069264 | 3/1996 |
| JP | 09204159 | 8/1997 |
| JP | 11095725 | 4/1999 |

* cited by examiner

*Primary Examiner*—Bipin Shalwala
*Assistant Examiner*—David L. Lewis
(74) *Attorney, Agent, or Firm*—Greer, Burns & Crain, Ltd.

(57) ABSTRACT

Disclosed are a liquid crystal display device and a method and a circuit for driving the same.

A gradation difference between the image data to be supplied to the picture elements of the same color of two pixels adjacent in a horizontal direction is detected in a gradation difference judging section, and when the gradation difference is larger than a predetermined gradation difference, it is judged in the same pattern of a size relationship detecting section and a horizontal pattern counting section whether the size relationship between the gradations of the picture elements of the same color of the two pixels repeats in the horizontal direction at least a certain number of times or not. And hence, when the size relationship repeats at least a certain number of times, it is compared with those of a plurality of lines continuously arranged in a vertical direction, and it is judged on the basis of the result of the comparisons whether a flicker occurs or not. And hence, when the flicker may occur over a plurality of frames, a polarity pattern switching signal is changed, whereby a polarity pattern which determines the polarities of the image data to be supplied from a data driver to a liquid crystal display panel is switched.

16 Claims, 30 Drawing Sheets vertical one-line inverted polarity pattern

FIG. 3A

| | | | | | | | | | | | |
|---|---|---|---|---|---|---|---|---|---|---|---|
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |

vertical two-line inverted polarity pattern

FIG. 3B

| | | | | | | | | | | | |
|---|---|---|---|---|---|---|---|---|---|---|---|
| + | − | + | − | + | − | + | − | + | − | + | − |
| + | − | + | − | + | − | + | − | + | − | + | − |
| − | + | − | + | − | + | − | + | − | + | − | + |
| − | + | − | + | − | + | − | + | − | + | − | + |
| + | − | + | − | + | − | + | − | + | − | + | − |
| + | − | + | − | + | − | + | − | + | − | + | − |

FIG. 13

| gradation group | three highmost bit 32 16 8 | gradation |
|---|---|---|
| (a) | 0 0 0 | 0~7 |
| (b) | 0 0 1 | 8~15 |
| (c) | 0 1 0 | 16~23 |
| (d) | 0 1 1 | 24~31 |
| (e) | 1 0 0 | 32~39 |
| (f) | 1 0 1 | 40~47 |
| (g) | 1 1 0 | 48~55 |
| (h) | 1 1 1 | 56~63 |

| line | N | | N+1 | judging |
|---|---|---|---|---|
| OR | L | < | H | * |
| OG | H | = | H | |
| OB | H | = | H | |
| ER | H | > | L | * |
| EG | H | = | H | |
| EB | H | = | H | |

gradation difference judging section size relationship detection section (OB)

size relationship detection section (EB)

the same pattern of a size relationship detection section size relationship detection section and horizontal pattern counting section horizontal pattern counting section horizontal pattern information storing section and vertical pattern comparing section vertical pattern counting section

| | |
|---|---|
| OG' : small、EG' : large | EG is larger by 9 or more steps of gradation difference |
| OG' : large、EG' : small | OG is larger by 9 or more steps of gradation difference |
| OG' : small、EG' : small | Gradation difference is smaller than 9 steps |
| OG' : large、EG' : large | Never occurs |

8-steps gradation subtraction circuit 6-steps gradation subtraction circuit vertical pattern counting section "ON" or "OFF" judging by threshold value (fixed 32-steps gradation)

| | |
|---|---|
| 20-steps gradation (−) (OFF) | 125-steps gradation (+) (ON) |
| 125-steps gradation (+) (ON) | 20-steps gradation (−) (OFF) |

FIG. 33A

| | |
|---|---|
| 33-steps gradation (−) (ON) | 250-steps gradation (+) (ON) |
| 250-steps gradation (+) (ON) | 33-steps gradation (−) (ON) |

FIG. 33B

"ON" or "OFF" judging by gradation difference (32-steps gradation or more)

| | |
|---|---|
| 20-steps gradation (−) (OFF) | 125-steps gradation (+) (ON) |
| 125-steps gradation (+) (ON) | 20-steps gradation (−) (OFF) |

FIG. 34A

| | |
|---|---|
| 33-steps gradation (−) (OFF) | 250-steps gradation (+) (ON) |
| 250-steps gradation (+) (ON) | 33-steps gradation (−) (OFF) |

FIG. 34B

LIQUID CRYSTAL DISPLAY DEVICE WITH JUDGING SECTION

BACKGROUND OF THE INVENTION

1. Field of the Invention

The present invention relates to a liquid crystal display device that displays an image by inverting the polarity of image data applied to the picture element electrodes of a liquid crystal display panel at certain intervals of time, and a circuit and a method for driving the liquid crystal display device. More specifically, it relates to an active matrix liquid crystal display device having a switching device for each picture element, and a circuit and a method for driving the liquid crystal display device.

2. Description of the Prior Art

An active matrix liquid crystal display panel comprises two glass substrates with a liquid crystal sealed therebetween. On one of the glass substrates, a plurality of picture element electrodes arranged in horizontal and vertical directions, and a plurality of switching devices for turning on and off the voltage applied to each picture element electrode are formed. As the switching device, a thin film transistor (to be referred to as "TFT" hereinafter) is often used.

Meanwhile, on the other glass substrate, color filters and a counter electrode are formed. These two glass substrates are disposed in such a manner that the surface on which the picture element electrodes are formed faces the surface on which the counter electrode is formed with each other. The color filters are classified by three colors, i.e., red (R), green (G) and blue (B), and the R, G and B color filters are arranged in a predetermined order such that one color filter corresponds to one picture element electrode. In the following description, a substrate having the picture element electrodes and TFTs will be called a "TFT substrate", and a substrate having the color filters and the counter electrode will be called a "counter substrate".

Further, a pair of polarizing plates are disposed such that the TFT substrate and the counter substrate with a liquid crystal sealed therebetween are sandwiched between the polarizing plates. The pair of polarizing plates are generally disposed such that polarizing axes cross each other at right angles.

The active matrix liquid crystal display panel is driven by an alternating voltage. That is, with the voltage applied to the counter electrode being a reference voltage (common voltage), a voltage which switches between positive polarity (+) and negative polarity (−) at certain intervals of time is supplied to the picture element electrode. The voltage applied to the liquid crystal preferably has a positive voltage waveform and a negative voltage waveform, which are symmetric. However, even if an alternating voltage having a positive voltage waveform and a negative voltage waveform which are symmetric is applied to the picture element electrode, the positive voltage waveform and negative voltage waveform of the voltage that is actually applied to the liquid crystal are not symmetric. Therefore, the light transmittance when a positive voltage is applied differs from the light transmittance when a negative voltage is applied, whereby luminance fluctuates at the period of the alternating voltage applied to the picture element electrode, resulting that the phenomenon called "flicker" occurs.

As conventionally used methods for controlling the occurrence of a flicker, there are known methods such as a method in which the voltage applied to the counter electrode is changed, a method in which the polarities of voltages applied to picture element electrodes adjacent in a horizontal or vertical direction are made different, and a method in which the frequency of inversion of polarities is made high. These techniques are disclosed in Japanese Patent Laid-Open Nos. 113129/1987, 34818/1990, 149174/1994, 175448/1995 and 204159/1997, for example.

When voltages of different polarities are applied to adjacent picture element electrodes, there can be used (1) a method in which voltages of one polarity are applied to picture element electrodes arranged in a vertical direction and voltages of the other polarity are applied to picture element electrodes adjacent in a horizontal direction, (2) a method in which voltages of one polarity are applied to picture element electrodes arranged in a horizontal direction and voltages of the other polarity are applied to picture element electrodes adjacent in a vertical direction, and (3) a method in which voltages of opposite polarities are applied to picture element electrodes adjacent in vertical and horizontal directions. A pattern which shows the polarities of voltages applied to the picture element electrodes of a liquid crystal display panel is called a "polarity pattern".

However, the flicker becomes conspicuous, when a vertical-stripe pattern is displayed with the polarity pattern of the above (1), when a horizontal-stripe pattern is displayed with the polarity pattern of the above (2), and when a mosaic pattern (checker pattern) is displayed with the polarity pattern of the above (3).

In Japanese Patent Laid-Open Nos. 297831/1993, 69264/1996 and 95725/1999, it is proposed that one polarity pattern is switched to another according to image data supplied to adjacent pixels. In the methods disclosed in these gazettes, a plurality of different polarity patterns are made available, and one polarity pattern is switched to another when the image data supplied to two adjacent picture elements have a particular relationship.

However, in the case of the above-described conventionally used methods for switching one polarity pattern to another, the polarity patterns are switched from one to another even when a predetermined pattern is present in a very small portion of a display screen. Therefore, the switching of polarity patterns frequently occurs, resulting in only a reduction in display quality.

SUMMARY OF THE INVENTION

The object of the present invention is to provide a liquid crystal display device that can reduce or prevent the occurrence of a flicker more surely and does not switches polarity patterns unnecessarily so as not to cause a reduction in display quality, and a method and a circuit for driving the liquid crystal display device.

The liquid crystal display device of the present invention, as exemplified in FIG. 8, comprises a liquid crystal display panel (13) having a plurality of picture elements arranged in horizontal and vertical directions, an image data output section (11) that outputs image data (RGB), a flicker-judging section (12) that detects the difference in gradation between the image data (RGB) supplied to picture elements of the same color of two pixels adjacent in a horizontal direction and judges whether a flicker occurs or not based on the result of the detection to output a polarity pattern switching signal (FLK), and a polarity image data-supplying section (14) which supplies the liquid crystal display panel (13) with the image data (RGB) outputted from the controller (11) with the polarities based on the polarity pattern corresponding to the polarity pattern switching signal (FLK).

The liquid crystal display device of the present invention has a flicker-judging section in which the difference in gradation between the image data of two pixels adjacent in a horizontal direction is detected by each picture element of the same color. When the difference in gradation between the image data of picture elements of the same color of two pixels adjacent in the horizontal direction is large, the size relationship between the image data of the two pixels is examined, and when the same size relationship repeats in between the pixels in the horizontal direction, it is concluded that there is a fear of occurrence of a flicker.

Thus, in the liquid crystal display device of the present invention, the polarity pattern is changed according to the image data. Therefore, the occurrence of the flicker can be prevented surely.

BRIEF DESCRIPTION OF THE DRAWINGS

For a more complete understanding of the present invention and the advantages thereof, reference is now made to the following description taken in conjunction with the accompanying drawings.

FIG. 3A is a diagram showing the vertical one-line inverted polarity pattern.

FIG. 3B is a diagram showing the vertical two-line inverted polarity pattern.

FIG. 13 is a diagram showing gradation groups classified by the three highmost bits of image data.

FIG. 33 is a diagram showing the judgment of picture elements as ON and OFF picture elements based on the threshold (fixed value).

FIG. 34 is a diagram showing the judgment of picture elements as ON and OFF picture elements based on the gradation difference.

DESCRIPTION OF THE PREFERRED EMBODIMENT

The present invention will be described in more detail below.

Figure 1A:
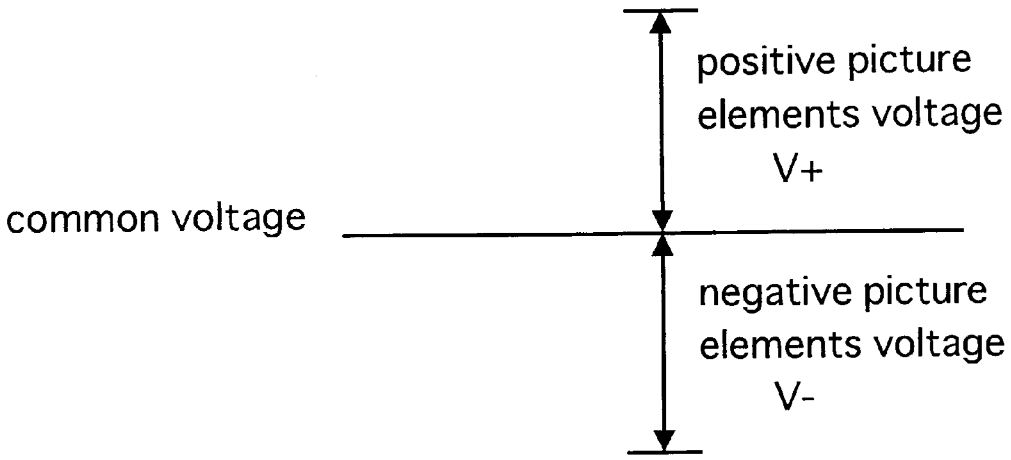
FIG. 1 is a schematic diagram showing the relationship among a common voltage, a picture element voltage of positive polarity and a picture element voltage of negative polarity.
Figure 1B:
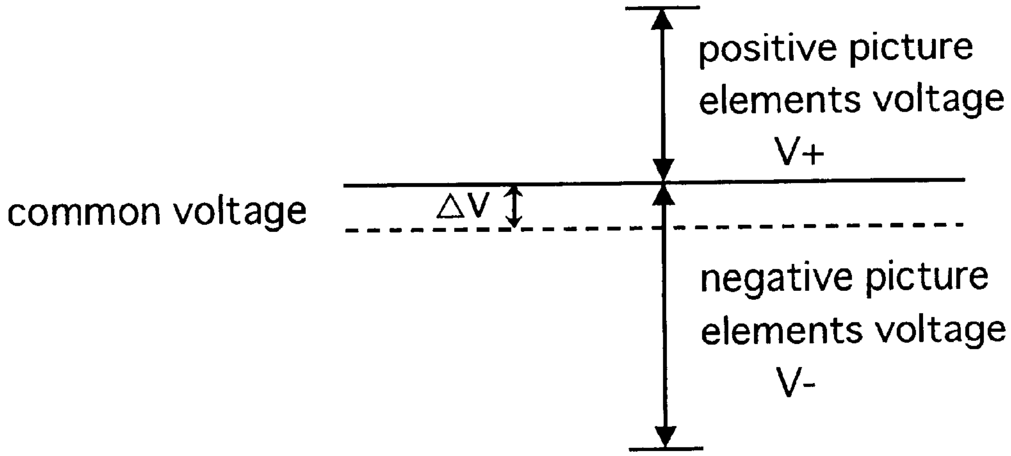
Figure 2:
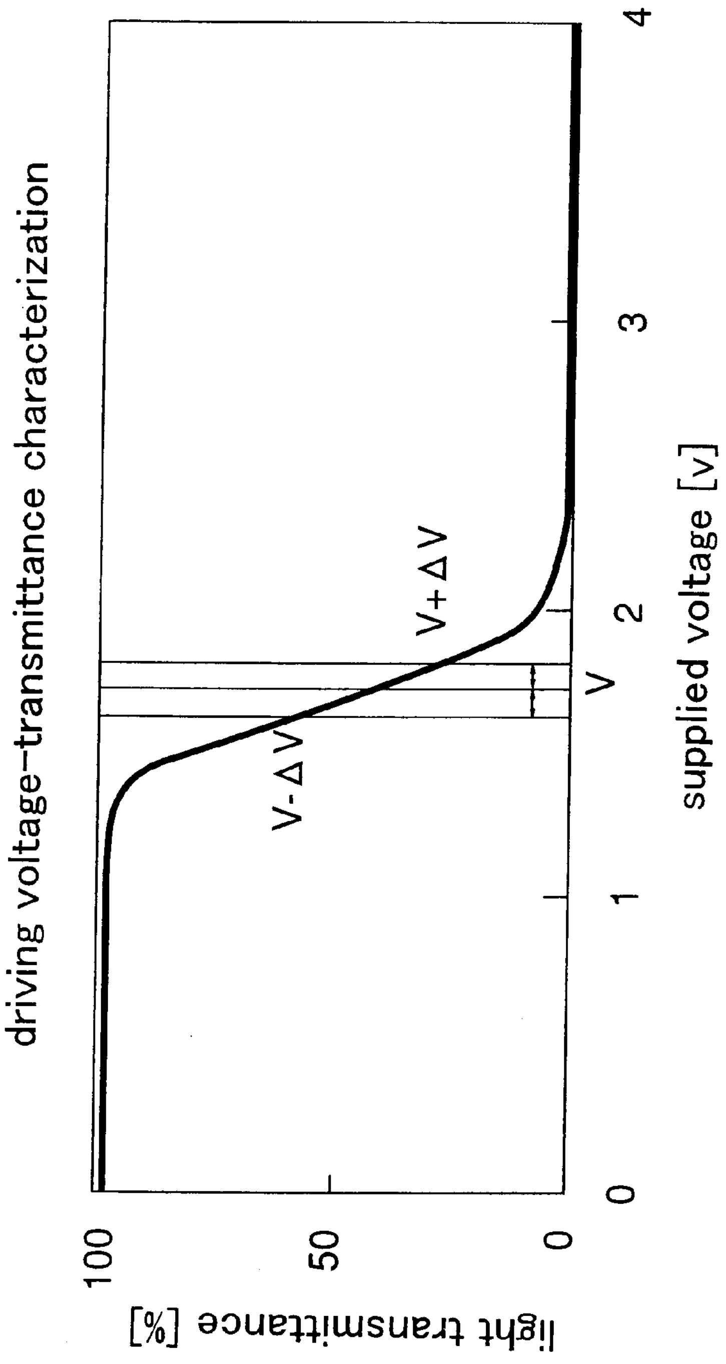
FIG. 2 is a diagram showing the relationship between the driving voltage and transmittance property of the liquid crystal display panel.

To the picture element electrode of the liquid crystal display device of the present invention, as shown in FIG. 1(*a*), a voltage of positive polarity and a voltage of negative polarity are applied alternately, with a common voltage applied to the counter electrode being a mean voltage. However, since the common voltage is not uniform across the whole display screen, the mean voltage is actually shifted by the amount of $\Delta V$ in the applied voltage of positive polarity and the applied voltage of negative polarity as shown in FIG. 1(*b*) and the applied voltage of positive polarity and the applied voltage of negative polarity therefore take values of $V-\Delta V$ and $V+\Delta V$, respectively. FIG. 2 is a diagram showing the relationship between an applied voltage indicated by the horizontal axis and light transmittance indicated by the vertical axis. In the case where the applied voltage is $V+\Delta V$ and in the case where the applied voltage is $V-\Delta V$ the light transmittance changes significantly, thereby causing a flicker.

FIG. 3 is a schematic diagram showing two polarity patterns used in the embodiments of the present invention. FIG. 3(*a*) shows a vertical one-line inverted polarity pattern, and FIG. 3(*b*) shows a vertical two-line inverted polarity pattern. In the vertical one-line inverted polarity pattern shown in FIG. 3(*a*), voltages of opposite polarities are applied to picture elements adjacent in horizontal or vertical directions. Further, in the vertical two-line inverted polarity pattern shown in FIG. 3(*b*), voltages of opposite polarities are applied to each picture element arranged in the horizontal direction and to each pair of picture elements arranged in vertical direction. The polarity of a voltage applied to each picture element is inverted by each frame.

Figure 4A:
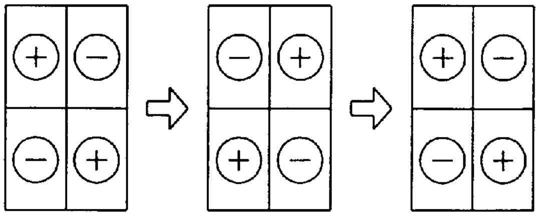
FIG. 4A is a diagram showing a display pattern in which a flicker does not occur with the vertical one-line inverted polarity pattern.
Figure 4B:
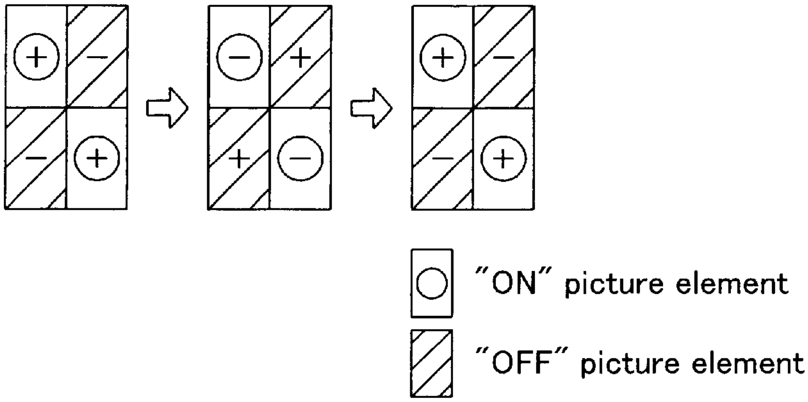
FIG. 4B is a diagram showing a display pattern in which a flicker occurs with the vertical one-line inverted polarity pattern.

FIG. 4 is a schematic diagram showing a method for driving the liquid crystal display device with the vertical one-line inverted polarity pattern. A voltage according to gradation is applied to the picture element electrode according to gradation, and in the case of a normally black liquid crystal display, light transmittance increases as the voltage applied to the picture element electrode increases. In the following description, a picture element to which a voltage which is a certain voltage or more (voltage corresponding to certain gradation) is applied will be called an "ON" picture element, and a picture element to which a voltage which is lower than the voltage is applied will be called an "OFF" picture element.

As shown in FIG. 4(*a*), when all picture elements are ON picture elements, the difference in light transmittance between when a voltage of positive polarity is applied and when a voltage of negative polarity is applied is leveled by picture elements adjacent to each other. Therefore, the light transmittance of each picture element changes in each frame, but as a whole, the light transmittance does not change in each frame. Therefore, a flicker does not occur in this case.

Meanwhile, when picture elements of one polarity are on and picture elements of the other polarity are off as shown in FIG. 4(*b*), the light transmittance changes in each frame as a whole, thereby causing a flicker.

Figure 5A:
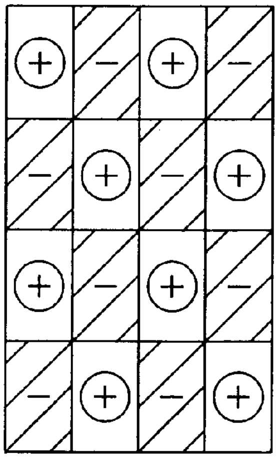
FIGS. 5A and 5B are diagrams showing a display pattern in which a flicker occurs with the vertical one-line inverted polarity pattern but does not occur with the vertical two-line inverted polarity pattern.
Figure 5B:
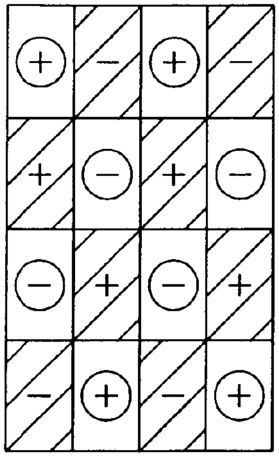
Figure 6A:
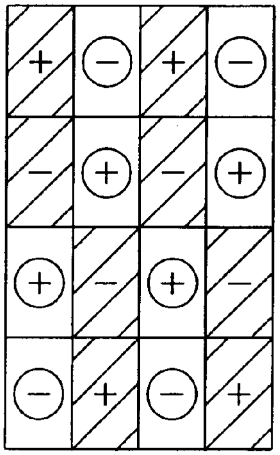
FIGS. 6A and 6B are diagrams showing a display pattern in which a flicker does not occur with the vertical one-line inverted polarity pattern but occurs with the vertical two-line inverted polarity pattern.
Figure 6B:
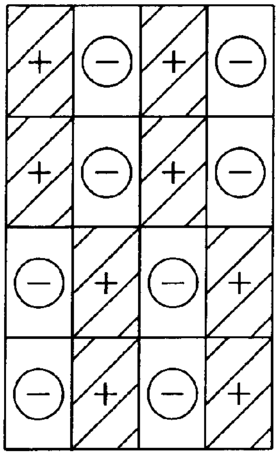

When a display pattern which has a flicker when driven with the vertical one-line inverted polarity pattern as shown in FIG. 5(*a*) is driven with the vertical two-line inverted polarity pattern, the occurrence of the flicker can be prevented since ON picture elements of positive and negative polarities are properly mixed as shown in FIG. 5(*b*). However, when a display pattern which does not have a flicker when driven with the vertical one-line inverted polarity pattern as shown in FIG. 6(*a*) is driven with the vertical two-line inverted polarity pattern, the polarities of ON picture elements are unified to one polarity as shown in FIG. 6(*b*), causing a flicker in some cases.

Figure 7:
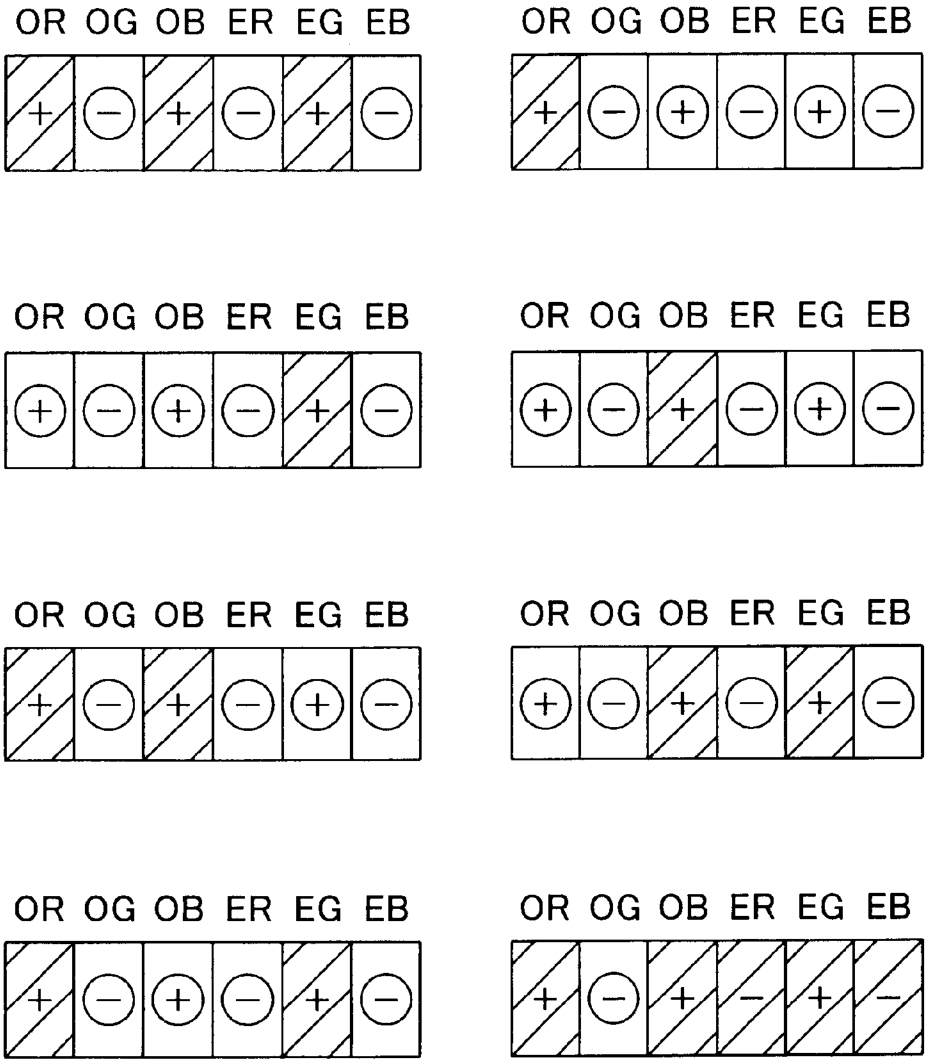
FIG. 7 shows display patterns in which a flicker is liable to occur with the vertical one-line inverted polarity pattern.

As described above, the liquid crystal display device does not have a flicker when ON picture elements of positive and negative polarities are mixed at a certain ratio but has a flicker when ON picture elements of either one of polarity occupy absolute majority. Further, regardless of polarity patterns, a pattern (display pattern) in which a flicker occurs definitely exists. In general, G (green) has higher transmittance than R (red), which has higher transmittance than B (blue). Thus, when ON picture elements of G picture elements of positive and negative polarities are not evenly mixed, a flicker is liable to occur. FIG. 7 shows an example of a display pattern which is liable to have a flicker when the vertical one-line inverted polarity pattern is used. FIG. 7 shows a plurality of sets of picture elements (six picture elements) arranged in the horizontal direction which constitute a pair of pixels, and OR, OG and OB represent the R picture element, G picture element and B picture element of an odd-numbered pixel and ER, EG and EB represent the R picture element, G picture element and B picture element of an even-numbered pixel.

In the present invention, the liquid crystal display panel is generally driven with the first polarity pattern (for example, vertical one-line inverted polarity pattern). At the same time, a display pattern is found from image data, and it is judged on the basis of the finding whether a flicker occurs or not. When it has been judged that the flicker will occur, the first polarity pattern is switched to the second polarity pattern (for example, vertical two-line inverted polarity pattern). Further, while the liquid crystal display panel is driven with the second polarity pattern, it is judged whether a flicker will occur with the first polarity pattern. When it has been judged that the flicker will not occur, the first polarity pattern is restored to drive the liquid crystal display panel. As described above, in the present invention, the occurrence of a flicker is prevented by switching polarity patterns according to a display pattern.

Incidentally, when it is to be judged whether a flicker occurs, it is considered that it is judged by setting a certain threshold and classifying an picture element to which a voltage that is higher than the threshold is applied as ON picture element and an picture element to which a voltage that is equal to or lower than the threshold is applied as OFF picture element. For example, when the threshold is set to be a 32-step gradation (fixed value) as shown in FIG. 33(*a*), a picture element to which a voltage corresponding to a 20-step gradation is applied is classified as OFF picture element and a picture element to which a voltage corresponding to a 125-step gradation is applied is classified as ON picture element, whereby it is properly concluded that a flicker may occur. However, even if a difference in gradation between adjacent picture elements is large, these picture elements are still classified as ON picture elements if voltages to be applied to the picture elements are higher than the threshold. Therefore, when a voltage corresponding to a 33-step gradation is applied to one of adjacent picture elements and a voltage corresponding to a 250-step gradation is applied to the other picture element as shown in FIG. 33(*b*), it is improperly concluded that a flicker will not occur.

Meanwhile, it can be more properly judged whether the flicker occurs or not by determining ON and OFF picture elements according to the difference in gradation between adjacent picture elements. For example, in FIG. 34, when the difference in gradation between adjacent picture elements is 32 or more, a picture element having a smaller gradation value is an OFF picture element and a picture element having a larger gradation value is an ON picture element. In this case, when a voltage corresponding to a 20-step gradation is applied to one of the adjacent picture elements and a voltage corresponding to a 125-step gradation is applied to the other picture element as shown in FIG. 34(*a*), it is judged that one of the picture elements is an OFF picture element and the other picture element is an ON picture element, whereby it is properly concluded that a flicker may occur. Further, even when a voltage corresponding to a 33-step gradation is applied to one of the picture elements and a voltage corresponding to a 250-step gradation is applied to the other picture element as shown in FIG. 34(*b*), it is judged that one of the picture elements is an OFF picture element and the other picture element is an ON picture element, whereby it is also properly concluded that a flicker may occur.

As described above, in the present invention, it can be more properly judged whether a flicker occurs or not by detecting the difference in gradation between the image data of adjacent picture elements. The embodiments of the present invention will be described with reference to the accompanying drawings hereinafter.

(First Embodiment)

(1) Constitution of Liquid Crystal Display Device

Figure 8:
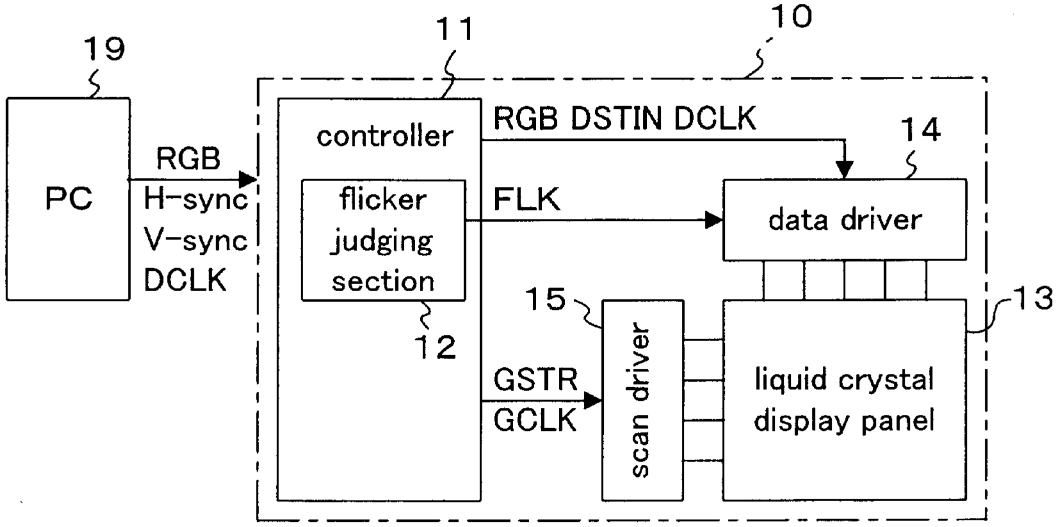
FIG. 8 is a block diagram showing the constitution of the liquid crystal display device related to the embodiment of the present invention.

FIG. 8 is a block diagram showing the liquid crystal display device of the first embodiment. This liquid crystal display device 10 comprises a controller 11, a liquid crystal display panel 13, a data driver 14, and a scan driver 15. Further, a flicker-judging section 12 is provided in the controller 11.

The controller 11 is connected to a personal computer (or other device that outputs a picture signal RGB) 19, and a horizontal synchronizing signal H-sync, a vertical synchronizing signal V-sync, a data clock DCLK and the picture signal RGB are supplied via the personal computer 19.

The picture signal RGB comprises three digital signals, i.e., an R signal representing the luminance of red, a G signal representing the luminance of green and a B signal representing the luminance of blue (hereinafter referred to as "R•G•B signals"). These R•G•B signals are transmitted at the timing synchronized with the data clock DCLK.

The controller 11 subjects the R•G•B signals to serial-parallel conversion to produce R (red) image data, G (green) image data and B (blue) image data, respectively, and outputs these image data at a predetermined timing. Further, the controller 11 receives the horizontal synchronizing signal H-sync, the vertical synchronizing signal V-sync and the data clock DCLK, and from these signals, produces various timing signals such as a data start signal DSTIN which indicates the starting point of a horizontal synchronizing period, a gate start signal GSTR which indicates the starting point of a vertical synchronizing period and a gate shift clock GCLK synchronized with the horizontal synchronizing signal H-sync.

The flicker-judging section 12 monitors the R•G•B image data to judge when a flicker occurs and sets the polarity pattern switching signal FLK to be "H" or "L" according to the result of the judgment. The details of the flicker-judging section 12 will be described later.

The data driver 14 receives the R•G•B image data and timing signals such as the data start signal DSTIN and the data clock DCLK from the controller 11 and supplies the R•G•B image data of positive polarity or of negative polarity to the liquid crystal display panel 13 at a predetermined timing. At this point, the data driver 14 sets the polarities of the R•G•B image data with the polarity pattern corresponding to the polarity pattern switching signal FLK outputted from the flicker-judging section 12. The details of the data driver 14 will also be described later.

The scan driver 15 receives timing signals such as the gate start signal GSTR and the gate shift clock GCLK from the controller 11 and supplies scanning signals to a plurality of gate bus lines provided on the liquid crystal display panel 13.

Note that in the case of the driving circuit for a TFT liquid crystal display panel, it is also possible to form the data driver 14 and the scan driver 15 on the TFT substrate of the liquid crystal display panel 13.

Although a description has been given to the case where the liquid crystal display device is connected to a computer 37 in the above example, the driving circuit for the liquid crystal display panel of the present invention can also be connected to a device that outputs a video signal such as a TV tuner. In that case, there are required circuits that generate the R•G•B signals, the horizontal synchronizing signal H-sync and the vertical synchronizing signal V-sync from the video signal, and conventionally known circuits can be used as these circuits.

(2) Constitution of Liquid Crystal Display Panel

Figure 9:
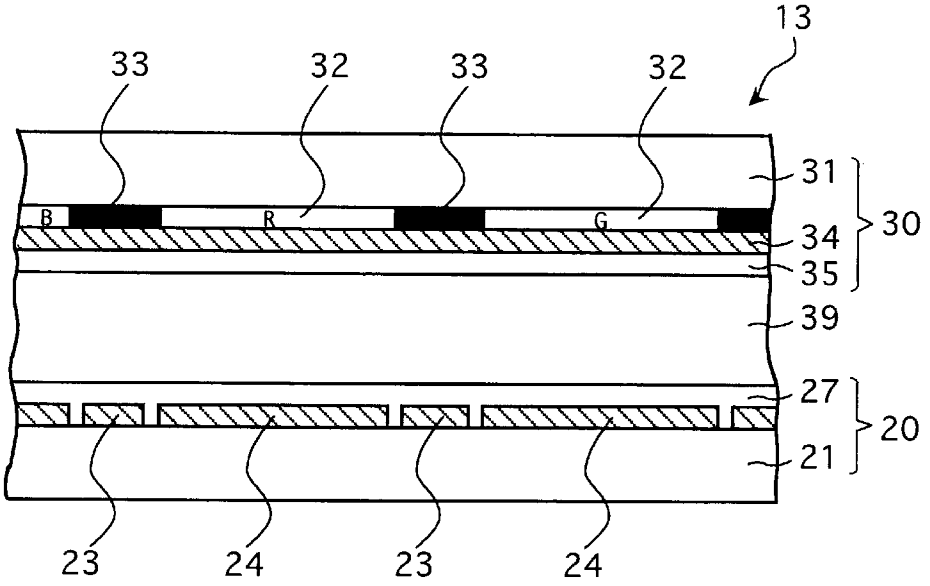
FIG. 9 is a sectional view of the liquid crystal display panel.
Figure 10:
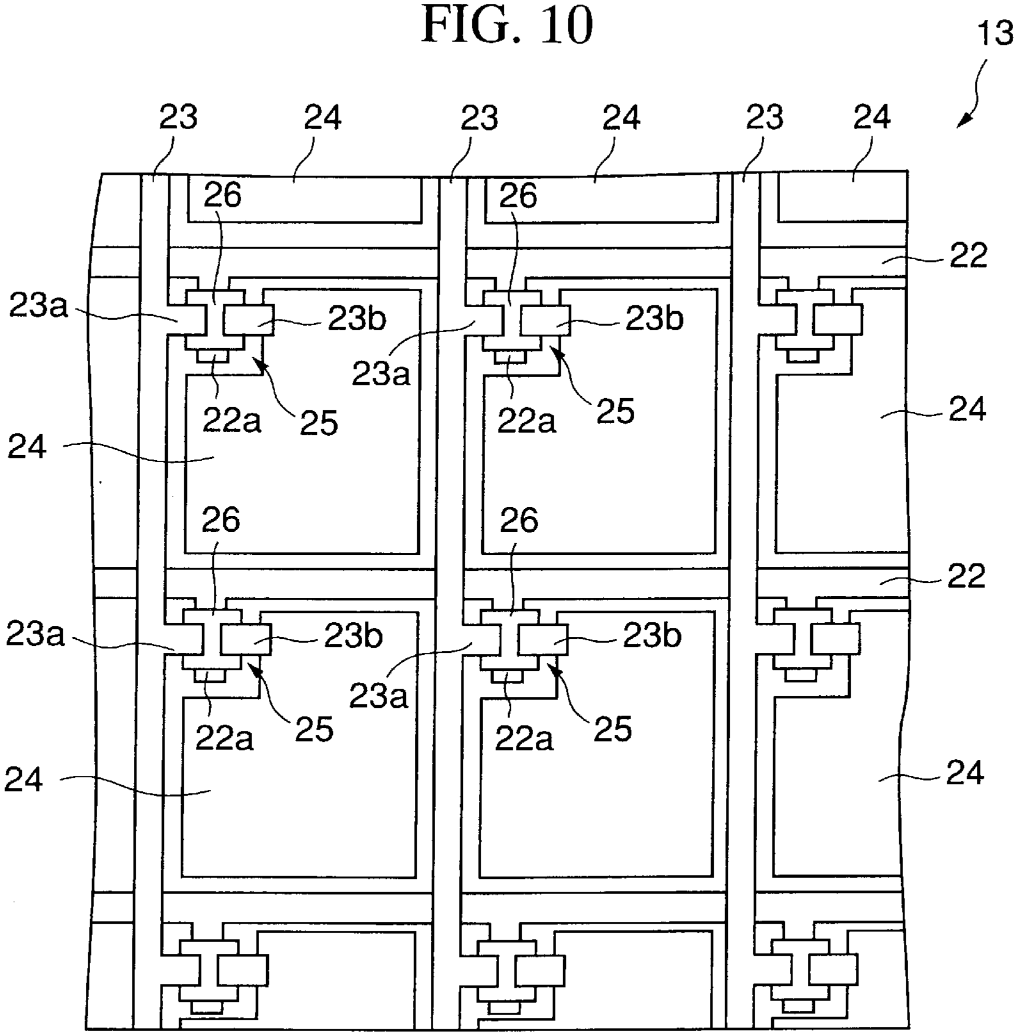
FIG. 10 is a plan view of the liquid crystal display panel.

FIG. 9 is a sectional view showing the constitution of the liquid crystal display panel of the embodiment of the present invention, and FIG. 10 is a plan view of the TFT substrate thereof.

The liquid crystal display panel 13 comprises a TFT substrate 20 and a counter substrate 30, which are opposed to each other, with a liquid crystal 39 sealed therebetween.

The TFT substrate 20 is constituted of a glass substrate 21, gate bus lines 22, data bus lines 23, picture element electrodes 24, TFTs 25 and the like, all of which are formed on the glass substrate 21. The gate bus lines 22 and the data bus lines 23 cross each other orthogonally and are electrically insulated with insulating films (not shown) formed therebetween. These gate bus lines 22 and the data bus lines 23 are made of metals such as aluminum.

Each of the rectangular regions partitioned by the gate bus lines 22 and the data bus lines 23 is a picture element. On each of the picture elements is formed a transparent picture element electrode 24 made of indium-tin oxide (hereinafter referred to as "ITO"). The TFT 25 is constituted of a gate electrode 22*a* connected to the gate bus line 22, a silicon film 26 formed on the gate electrode 22*a* via a gate insulating film (not shown), and a drain electrode 23*a* and a source electrode 23*b* which are formed on the silicon film 26. The drain electrode 23*a* is connected to the data bus line 23, and the source electrode 23*b* is connected to the picture element electrode 24. Further, a storage capacity electrode, which is not shown, is formed such that it overlaps a part of the picture element electrode 24.

On the picture element electrode 24 is formed an alignment layer 27 made of, for example, polyimide. The surface of the alignment layer 27 has been subjected to alignment layer treatment to determine the alignment of liquid crystal molecules when a voltage is not applied. As a typical method for conducting the orientation treatment, a "rubbing" method has been known in which the surface of the alignment layer is rubbed in one direction with a cloth roller.

Meanwhile, the counter substrate 30 is constituted of a glass substrate 31, color filters 32, black matrices 33, a counter electrode 34, an orientation film 35 and the like, all of which are formed underneath the glass substrate 31. The color filters 32 are classified by three colors, i.e., red (R), green (G) and blue (B), and one color filter 32 is opposed to one picture element electrode 24. In the present embodiment, the color filters 32 are arranged in the horizontal direction in the order of R•G•B The black matrix 33 is formed between these color filters 32. This black matrix 33 is made of a thin opaque metal film such as chromium (Cr).

Underneath the color filters 32 and the black matrices 33 is formed the transparent counter electrode 34 made of ITO. Underneath the counter electrode 34 is formed the alignment layer 35. The surface of this alignment layer 35 has also been subjected to alignment layer treatment.

Between the TFT substrate 20 and the counter substrate 30 is disposed a spherical spacer (not shown), which serves to keep the space between TFT substrate 20 and the counter substrate 30 constant. Further, both underneath the TFT substrate 20 and on the counter substrate 30, a polarizing plate (not shown) is disposed respectively. These polarizing plates are disposed such that polarizing axes cross each other orthogonally.

When the image data is supplied to the data bus line 23 and the scan signal is supplied to the gate bus line 22, the TFT 25 is turned on, and the image data is supplied to the picture element electrode 24, whereby an electric field is generated between the picture element electrode 24 and the counter electrode 34. The alignment of liquid crystal molecules in the liquid crystal 39 is changed by this electric field, whereby the light transmittances of the picture elements are changed. By controlling a voltage applied to the picture element electrode 24 of each picture element independently, a desired image can be displayed on the liquid crystal display panel 13.

(3) Flicker-judging Section

Figure 11:
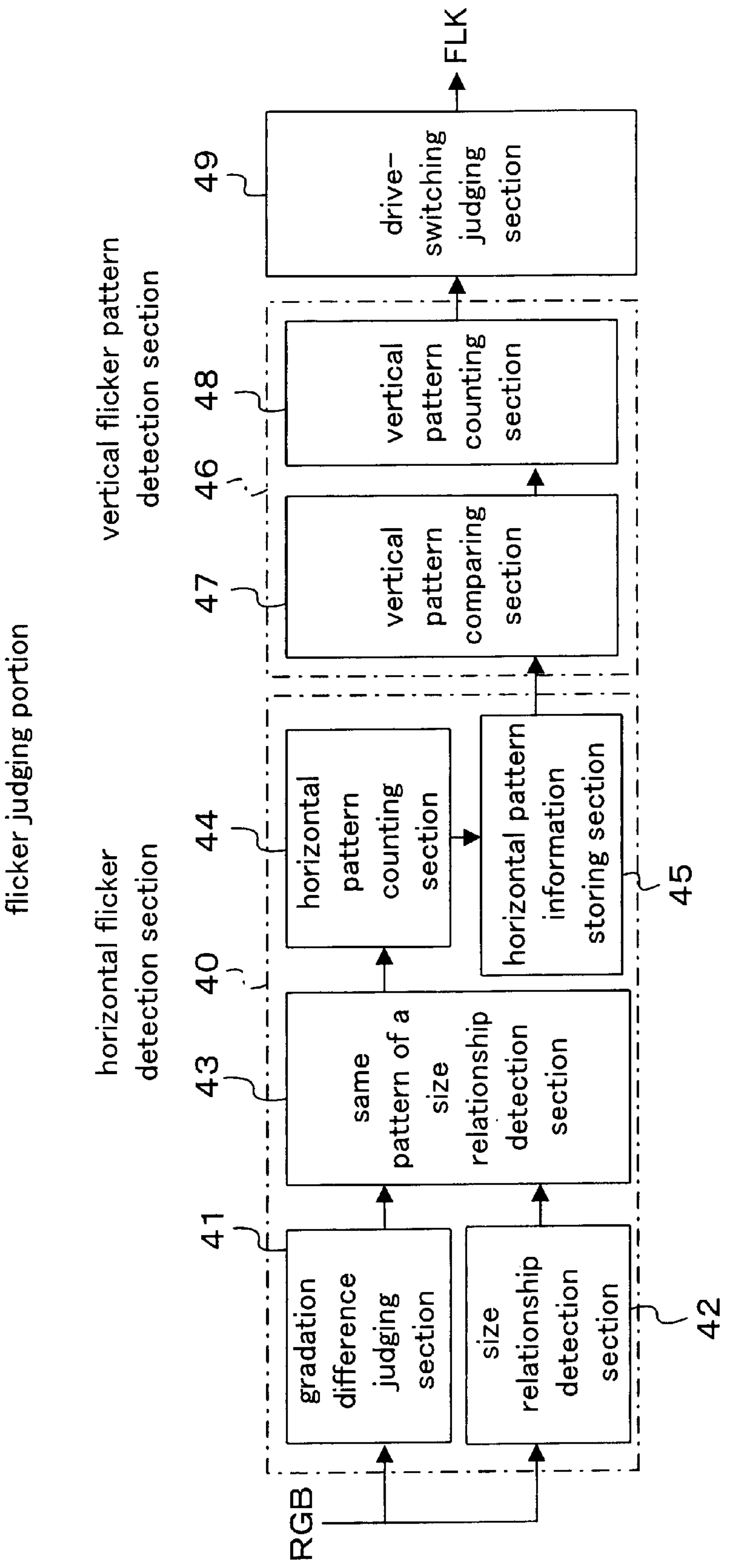
FIG. 11 is a block diagram showing the constitution of the flicker-judging section.

FIG. 11 is a block diagram showing the constitution of the flicker-judging section 12.

The flicker-judging section 12 is constituted of a horizontal flicker pattern detecting section 40, a vertical flicker pattern detecting section 46, and a drive-switching judging section 49. Further, the horizontal flicker pattern detecting section 40 is constituted of a gradation difference judging section 41, a size relationship detecting section 42, the same pattern of a size relationship detecting section 43, a horizontal pattern counting section 44, and a horizontal pattern information storing section 45. The vertical flicker pattern detecting section 46 is constituted of a vertical pattern comparing section 47 and a vertical pattern counting section 48.

Figure 12:
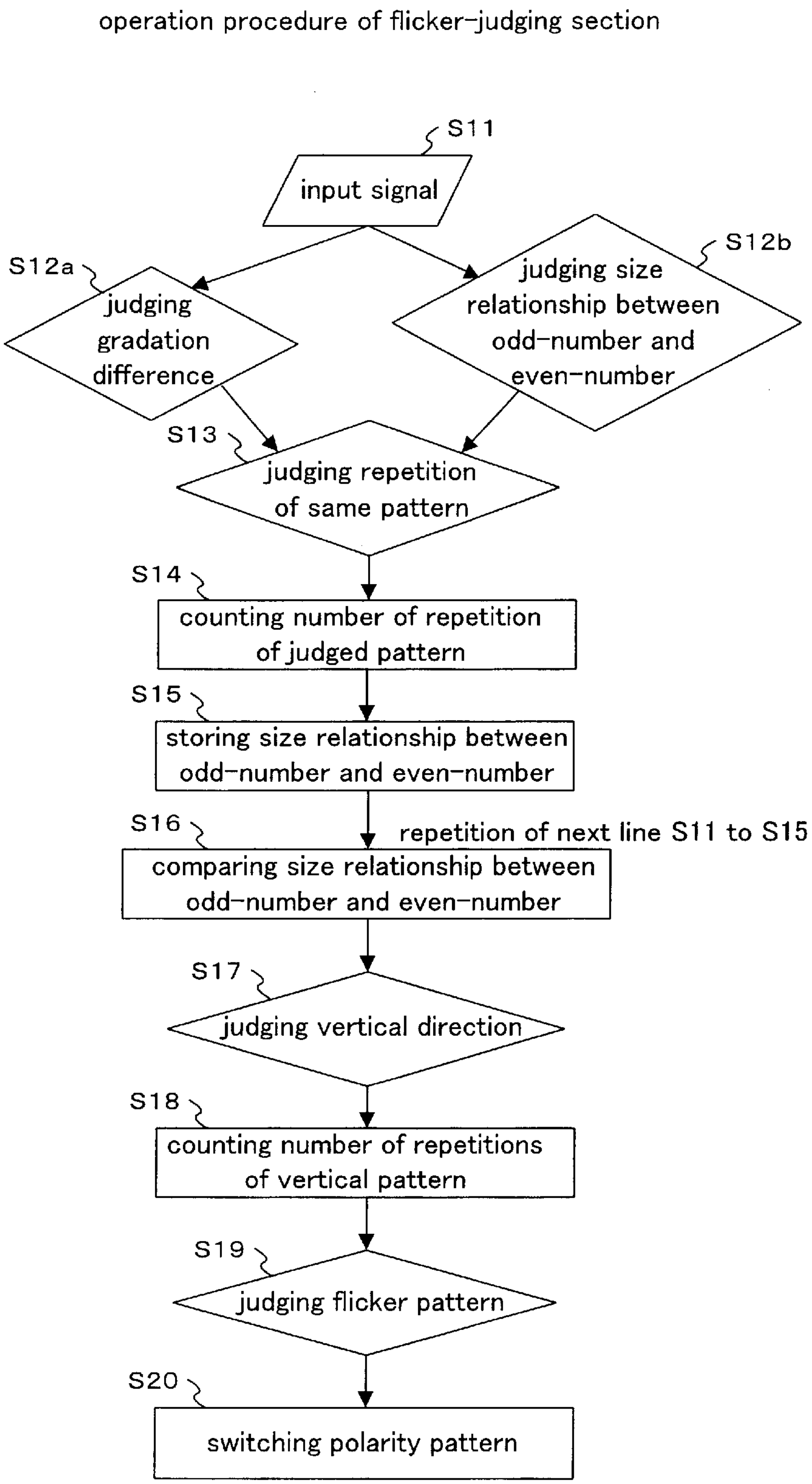
FIG. 12 is a flow chart showing the operating procedure of the flicker-judging section.

FIG. 12 is a flow chart showing the operating procedure of the flicker-judging section 12. The operations of the sections constituting the flicker-judging section 12 will be described with reference to FIG. 12.

The image data (RGBRGB) for two pixels (odd-numbered pixel and even-numbered pixel) continuously arranged in the horizontal direction are supplied sequentially to the gradation difference judging section 41 and the size relationship detecting section 42 (step S11). The gradation difference judging section 41 compares the image data for these two adjacent pixels with each other for respective colors and detects gradation differences (step S12*a*). When the gradation difference between these image data is equal to or higher than a certain gradation difference, a signal "H" is outputted.

For example, it is assumed that each of R, G and B image data is a 6-bit image data (data with a 64-step gradation). In this case, as shown in FIG. 13, gradations are classified into eight groups ((a) to (h)) according to the values of the three highmost bits, and when the gradation of the image data of one of the pixels differs from the gradation of the image data of the other pixel by two or more groups, a signal "H" is outputted. The gradation difference is evaluated for each of R, G and B, and when the gradation difference between the image data of one of these colors is two or more groups, the output of the gradation difference judging section 41 is "H".

The size relationship detecting section 42 detects the size relationship between the R image data of the odd-numbered pixel and the R image data of the even-numbered pixel, the size relationship between the G image data of the odd-numbered pixel and the G image data of the even-numbered pixel and the size relationship between the B image data of the odd-numbered pixel and the B image data of the even-numbered pixel, and supplies the results to the same pattern of a size relationship detecting section 43 (step S12*b*).

Figure 14:
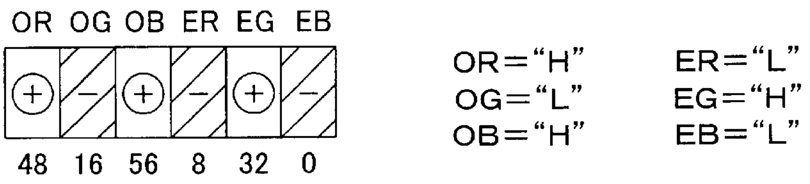
FIG. 14 is a diagram showing an example of the size relationships between each image data of two pixels.

For example, as shown in FIG. 14, it is assumed that the R image data (OR), G image data (OG) and B image data (OB) of the odd-numbered pixel are denoted by 48, 16 and 56 and the R image data (ER), G image data (EG) and B image data (EB) of the even-numbered pixel are denoted by 8, 32 and 0, respectively. In this case, in the present embodiment, a signal representing the size relationship, that is, OR="H", ER="L", OG="L", EG="H", OB="H" and EB="L", is outputted for each picture element from the size relationship detecting section 42 as shown in FIG. 14.

Figure 15:
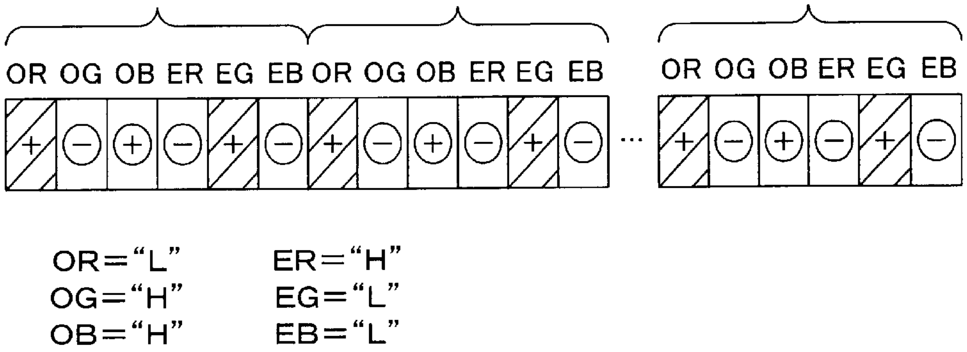
FIG. 15 is a diagram showing an example of the repetition of the same pattern.

The same pattern of a size relationship detecting section 43 detects the same size relationship pattern based on the signals outputted from the gradation difference judging section 41 and the size relationship detecting section 42 (step S13). That is, when the output of the gradation difference judging section 41 is "H", it detects whether the size relationship repeats or not as shown in FIG. 15.

The horizontal pattern counting section 44 counts the number of repetitions of the same pattern detected by the same pattern of a size relationship detecting section 43 (step S14). When the same pattern repeats at least a certain number of times, the horizontal pattern information storing section 45 stores the size relationship pattern in a shift register (step S15). In the example of FIG. 15, as the size relationship pattern, OR="L", OG="H", OB="H", ER="H", EG="L" and EB="L" are stored. For example, when OR and ER store "L" and "H", respectively, this indicates that the gradation difference between the R image data of the odd-numbered pixel and the R image data of the even-numbered pixel is equal to or more than a certain gradation difference and that the pattern repeats in one line (one horizontal synchronizing period) at least a certain number of times.

Figure 16:
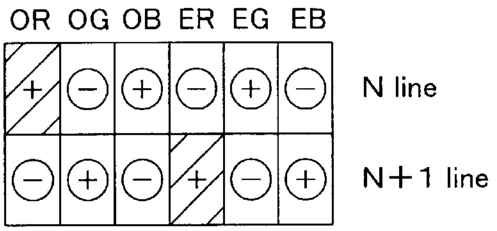
FIG. 16 is a diagram showing the detection of patterns in a vertical direction.

The vertical pattern comparing section 47 compares a series of picture element patterns in the vertical direction with one another (steps S16 and S17). That is, as shown in FIG. 16, it compares the image data of the Nth line with the image data of the N+1th line for respective R, G and B, and when at least one of the size relationships between the OR's, OG's, OB's, ER's, EG's and EB's of the two lines is inverted, it outputs "H". When the output of the vertical pattern comparing section 47 is "H", the display pattern is a checker pattern as shown in FIG. 5.

Figure 17:
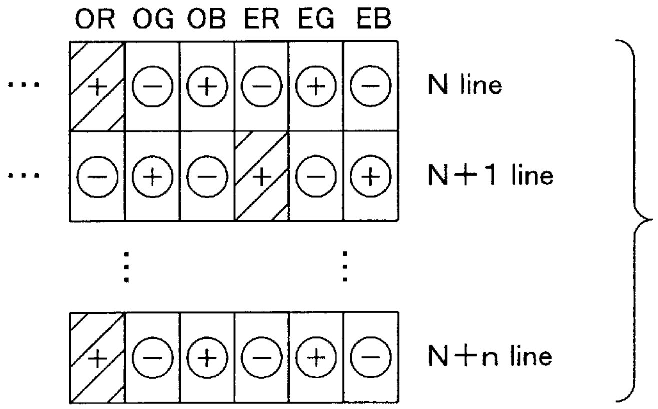
FIG. 17 is a diagram showing an example of patterns continuously arranged in the vertical direction.

The vertical pattern counting section 48 counts the number of lines having different size relationships from those of the next line in the vertical direction, as shown in FIG. 17, based on the output of the vertical pattern comparing section 47 (step S18). When the number of lines having different size relationships from those of the next line in the vertical direction reaches a predetermined value, the output signal is set to be "H" (step S19).

The drive-switching judging section 49 sets the polarity pattern switching signal FLK to be "H" when the output signal of the vertical pattern counting section 48 remains "H" over a series of frames (for example, 8 frames), or "L" when the output signal of the vertical pattern counting section 48 remains "L" over a series of frames (for example, 8 frames) (step S20).

The present embodiment will be described with reference to the more detailed circuits of the flicker-judging section 12 hereinafter. Note that in the following example, R image data, G image data and B image data each are 6-bit data.

(i) Gradation Difference Judging Section

Figure 18:
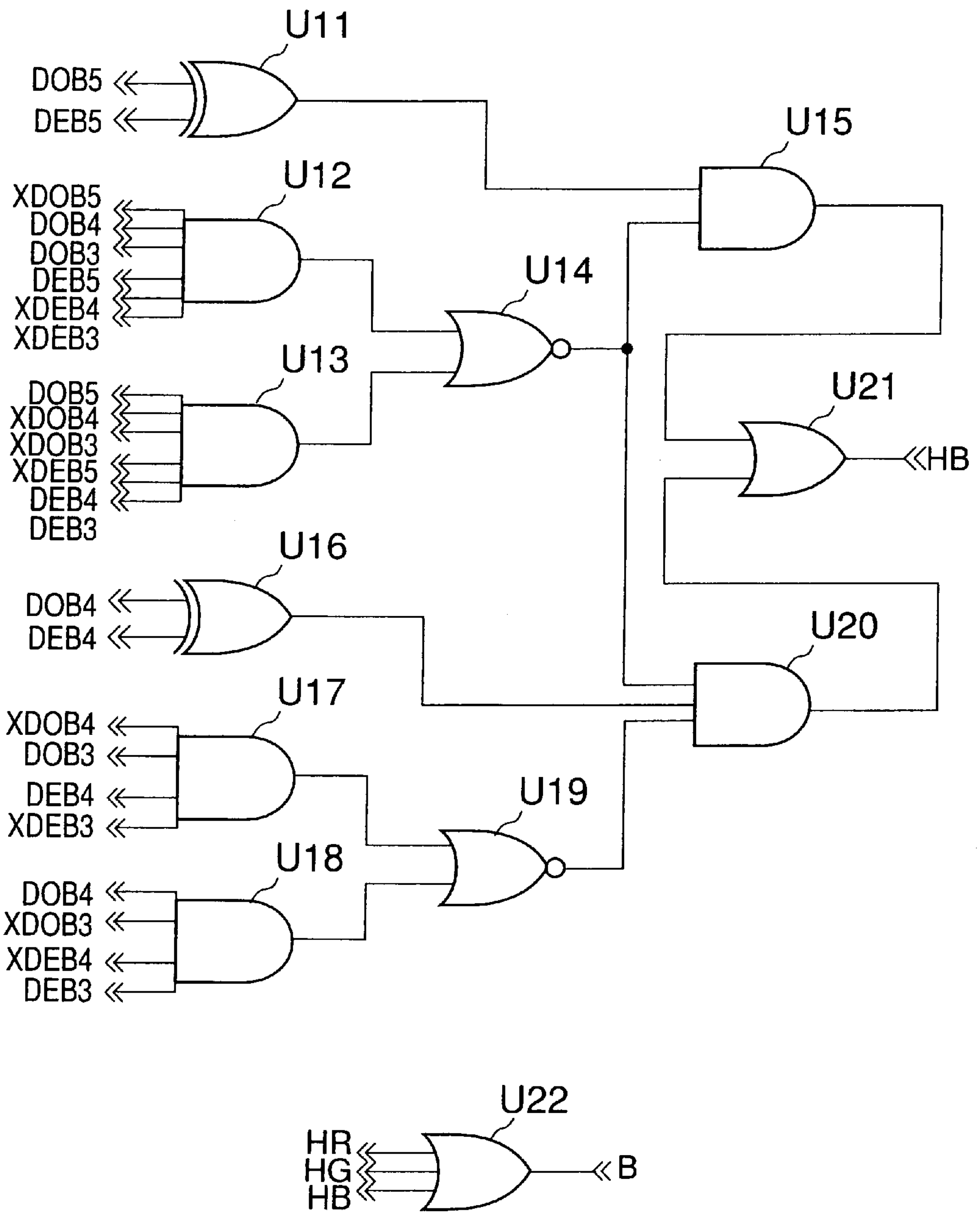
FIG. 18 is a circuit diagram of the gradation difference judging section.

FIG. 18 is a circuit diagram showing the constitution of the gradation difference judging section 41. In FIG. 18, however, only a circuit for judging the gradation of blue (B) image data is shown.

This circuit is constituted of XOR (exclusive OR) gates U11 and U16, AND gates U12, U13, U15, U17, U18 and U20, NOR gates U14 and U19, and an OR gate U21. The XOR gate U11 is supplied with the fifth bit (DOB5) of the B image data of the odd-numbered pixel and the fifth bit (DEB5) of the B image data of the even-numbered pixel. It outputs "H" when one of these B image data is "H" and the other is "L" and outputs "L" in other cases.

The AND gate U12 receives the inversion signal (XDOB5) of the fifth bit of the B image data of the odd-numbered pixel, the fourth bit (DOB4) of the B image data of the odd-numbered pixel, the third bit (DOB3) of the B image data of the odd-numbered pixel, the fifth bit (DEB5) of the B image data of the even-numbered pixel, the inversion signal (XDEB4) of the fourth bit of the B image data of the even-numbered pixel, and the inversion signal (XDEB3) of the third bit of the B image data of the even-numbered pixel. It outputs "H" when all of these are "H" and outputs "L" in other cases.

The AND gate U13 receives the fifth bit (DOB5) of the B image data of the odd-numbered pixel, the inversion signal (XDOB4) of the fourth bit of the B image data of the odd-numbered pixel, the inversion signal (XDOB3) of the third bit of the B image data of the odd-numbered pixel, the inversion signal (XDEB5) of the fifth bit of the B image data of the even-numbered pixel, the fourth bit (DEB4) of the B image data of the even-numbered pixel, and the third bit (DEB3) of the B image data of the even-numbered pixel. It outputs "H" when all of these are "H" and outputs "L" in other cases.

The NOR gate U14 outputs "L" when at least one of the outputs of the AND gates U12 and U13 is "H" and outputs "H" when both of the outputs are "L". The AND gate U15 outputs "H" when both of the outputs of the XOR gate U11 and the NOR gate U14 are "H" and outputs "L" in other cases.

The XOR gate U16 receives the fourth bit (DOB4) of the B image data of the odd-numbered pixel and the fourth bit (DEB4) of the B image data of the even-numbered pixel. It outputs "H" when one of these bits is "H" and the other is "L" and outputs "L" in other cases.

The AND gate U17 receives the inversion signal (XDOB4) of the fourth bit of the B image data of the odd-numbered pixel, the third bit (DOB3) of the B image data of the odd-numbered pixel, the fourth bit (DEB4) of the B image data of the even-numbered pixel, and the inversion signal (XDEB3) of the third bit of the B image data of the odd-numbered pixel. It outputs "H" when all of these are "H" and outputs "L" in other cases.

The AND gate U18 receives the fourth bit (DOB4) of the B image data of the odd-numbered pixel, the inversion signal (XDEB3) of the third bit of the B image data of the odd-numbered pixel, the inversion signal (XDEB4) of the fourth bit of the B image data of the even-numbered pixel, and the third bit (DEB3) of the B image data of the even-numbered pixel. It outputs "H" when all of these are "H" and outputs "L" in other cases.

The NOR gate U19 outputs "L" when at least one of the outputs of the AND gates U17 and U18 is "H" and outputs "H" when both of the outputs are "L".

The AND gate U20 outputs "H" when the outputs of the NOR gate U14, XOR gate U16 and NOR gate U19 are all "H" and outputs "L" in other cases. The OR gate U21 outputs a signal HB which receives "H" when at least one of the outputs of the AND gates U15 and U20 is "H" and the value "L" when both of the outputs are "L".

This gradation difference judging section 41 classifies the image data under eight groups (a) to (h) according to gradation as shown in FIG. 13, and outputs "H" when the gradation of the image data of the odd-numbered pixel differs from the gradation of the image data of the even-numbered pixel by two or more groups. For example, it sets the signal HB to be "H" when the B image data of the odd-numbered pixel belongs to the group (a) and the B image data of the even-numbered pixel belongs to any one of the groups (c) to (h). Further, it also sets the signal HB to be "H" when the B image data of the odd-numbered pixel belongs to the group (e) and the B image data of the even-numbered pixel belongs to any one of the groups (a) to (c) or either of the groups (g) or (h).

By similar circuits, a signal HR corresponding to the difference in gradation between the R image data of the odd-numbered pixel and the R image data of the even-numbered pixel and a signal HG corresponding to the difference in gradation between the G image data are generated. The OR gate U22 outputs a signal B which become "H" when at least one of the signals HR, HG and HB is "H" and becomes "L" when all the signals are "L".

(ii) Size Relationship Detecting Section

Figure 19:
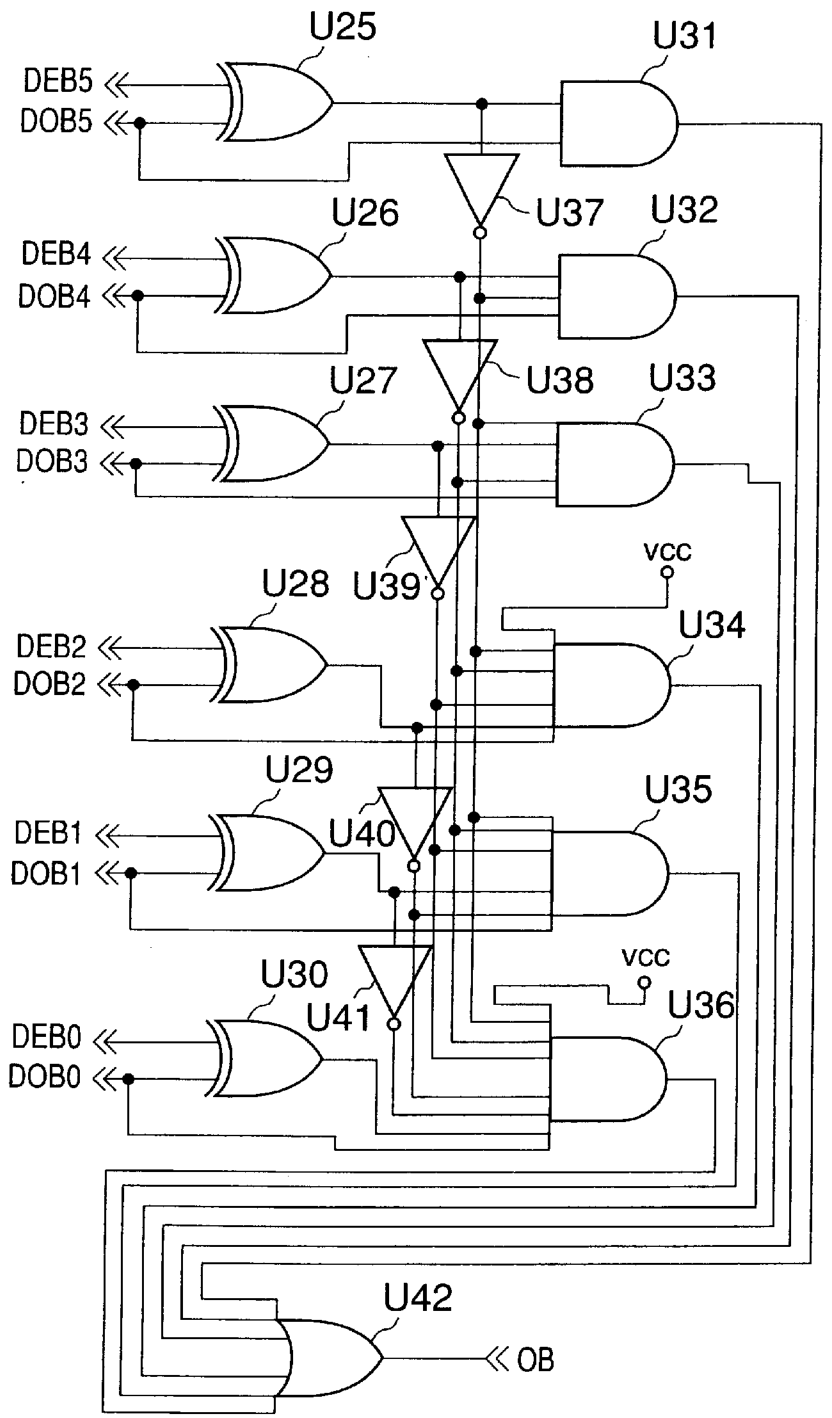
FIG. 19 is a circuit diagram showing the size relationship detecting section (OB).
Figure 20:
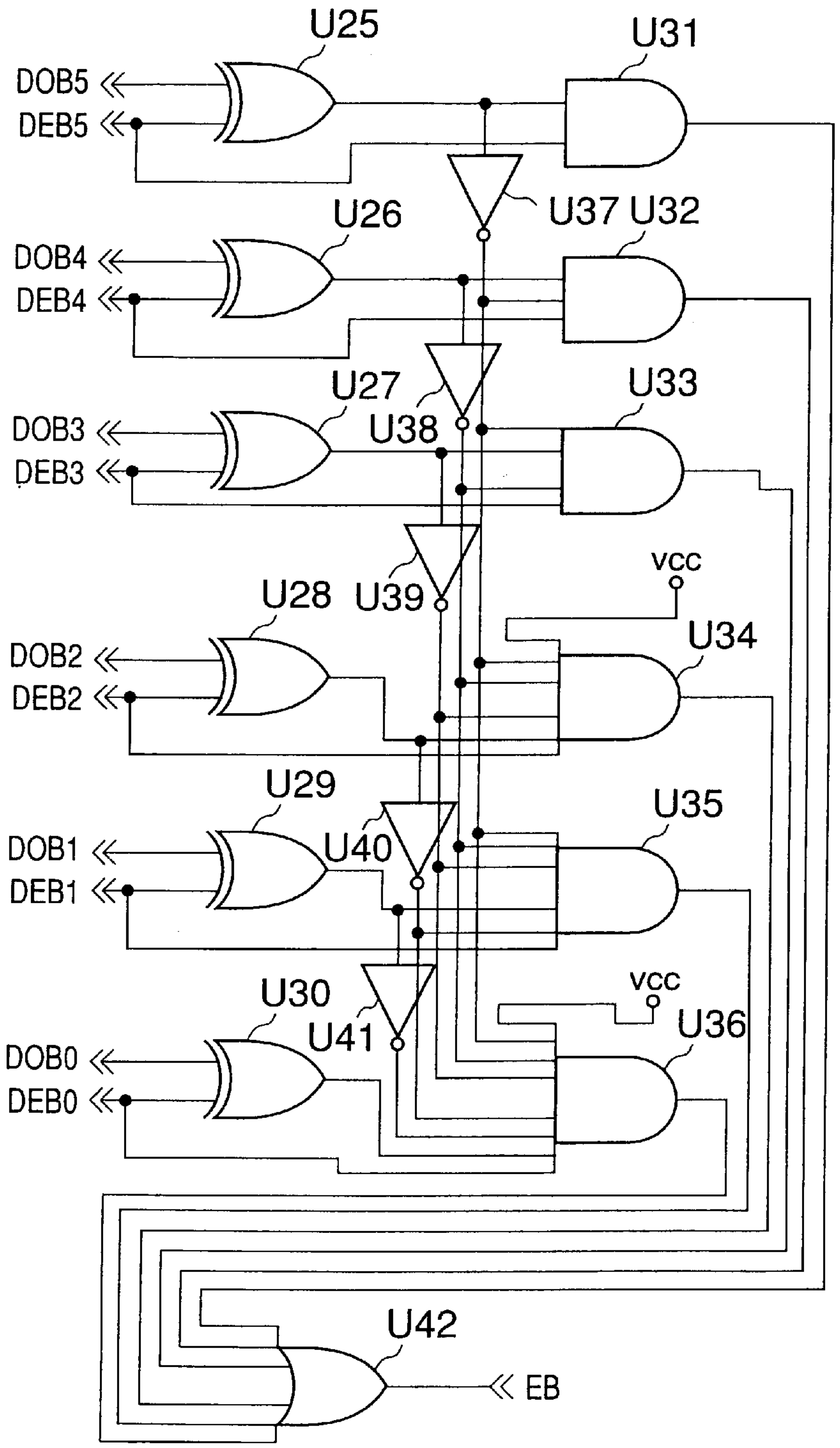
FIG. 20 is a circuit diagram showing the size relationship detecting section (EB).

FIGS. 19 and 20 are circuit diagrams showing the constitution of the size relationship detecting section. The circuit shown in FIG. 19 outputs a signal OB which becomes "H" when the B image data of the even-numbered pixel is larger than the B image data of the odd-numbered pixel and becomes "L" in other cases. The circuit shown in FIG. 20 outputs a signal EB which becomes "H" when the B image data of the odd-numbered pixel is larger than the B image data of the even-numbered pixel and becomes "L" in other cases. Further, the size relationship detecting section 42 has a circuit that outputs a signal OR which becomes "H" when the R image data of the even-numbered pixel is larger than the R image data of the odd-numbered pixel and becomes "L" in other cases, a circuit that outputs a signal ER which becomes "H" when the R image data of the odd-numbered pixel is larger than the R image data of the even-numbered pixel and becomes "L" in other cases, a circuit that outputs a signal OG which becomes "H" when the G image data of the even-numbered pixel is larger than the G image data of the odd-numbered pixel and becomes "L" in other cases, and a circuit that outputs a signal EG which becomes "H" when the G image data of the odd-numbered pixel is larger than the G image data of the even-numbered pixel and becomes "L" in other cases. Since these circuits have the same constitutions as those of the circuits shown in FIGS. 19 and 20 except that the input and output signals are different, the illustrations and descriptions of these circuits are omitted.

The circuit of FIG. 19 is constituted of six XOR gates U25 to U30, six AND gates U31 to U36, five inverters U37 to U41, and an OR gate U42.

The XOR gate U25 receives the fifth bit (DOB5) of the B image data of the odd-numbered pixel and the fifth bit (DEB5) of the B image data of the even-numbered pixel. It outputs "H" when one of these bits is "H" and the other is "L" and outputs "L" in other cases. The AND gate U31 outputs "H" when both the output of the XOR gate U25 and the fifth bit (DOB5) of the B image data of the odd-numbered pixel are "H" and outputs "L" in other cases.

The XOR gate U26 receives the fourth bit (DOB4) of the B image data of the odd-numbered pixel and the fourth bit (DEB4) of the B image data of the even-numbered pixel. It outputs "H" when one of these bits is "H" and the other is "L" and outputs "L" in other cases. The AND gate U32 outputs "H" when the output of the XOR gate U26, the fourth bit (DOB4) of the B image data of the odd-numbered pixel and the output of the XOR gate U25 which has been inverted by the inverter U37 are all "H" and outputs "L" in other cases.

The XOR gate U27 receives the third bit (DOB3) of the B image data of the odd-numbered pixel and the third bit (DEB3) of the B image data of the even-numbered pixel. It outputs "H" when one of these bits is "H" and the other is "L" and outputs "L" in other cases. The AND gate U33 outputs "H" when the output of the XOR gate U27, the third bit (DOB3) of the B image data of the odd-numbered pixel, the output of the XOR gate U26 which has been inverted by the inverter U38 and the output of the inverter U37 are all "H" and outputs "L" in other cases.

The XOR gate U28 receives the second bit (DOB2) of the B image data of the odd-numbered pixel and the second bit (DEB2) of the B image data of the even-numbered pixel. It outputs "H" when one of these bits is "H" and the other is "L" and outputs "L" in other cases. The AND gate U34 outputs "H" when the output of the XOR gate U28, the second bit (DOB2) of the B image data of the odd-numbered pixel, the output of the XOR gate U27 which has been inverted by the inverter U39, the output of the inverter U38 and the output of the inverter U37 are all "H" and outputs "L" in other cases.

The XOR gate U29 receives the first bit (DOB1) of the B image data of the odd-numbered pixel and the first bit (DEB1) of the B image data of the even-numbered pixel. It outputs "H" when one of these bits is "H" and the other is "L" and outputs "L" in other cases. The AND gate U35 outputs "H" when the output of the XOR gate U29, the first bit (DOB1) of the B image data of the odd-numbered pixel, the output of the XOR gate U28 which has been inverted by the inverter U40, the output of the inverter U39, the output of the inverter U38 and the output of the inverter U37 are all "H" and outputs "L" in other cases.

The XOR gate U30 receives the zero bit (DOB0) of the B image data of the odd-numbered pixel and the zero bit (DEB0) of the B image data of the even-numbered pixel. It outputs "H" when one of these bits is "H" and the other is "L" and outputs "L" in other cases. The AND gate U36 outputs "H" when the output of the XOR gate U30, the zero bit (DOB0) of the B image data of the odd-numbered pixel, the output of the XOR gate U29 which has been inverted by the inverter U41, the output of the inverter U40, the output of the inverter U39, the output of the inverter U38 and the output of the inverter U37 are all "H" and outputs "L" in other cases.

The OR gate U42 outputs a signal OB which becomes "H" when at least one of the outputs of the AND gates U31 to U36 is "H" and becomes "L" in other cases. When the signal OB is "H", it indicates that the B image data of the odd-numbered pixel is larger than the B image data of the even-numbered pixel.

The description of the circuit shown in FIG. 20 is omitted since it is the same circuit as that of FIG. 19 except that the order of the B image data of the odd-numbered pixel and the B image data of the even-numbered pixel which are inputted to the XOR gates U25 and U30 is inverted. The circuit shown in FIG. 20 outputs a signal EB which becomes "H" when the B image data of the even-numbered pixel is larger than the B image data of the odd-numbered pixel.

For example, as shown in FIG. 14, when the gradations of R, G and B of the odd-numbered pixel are 48, 16 and 56 and the gradations of R, G and B of the even-numbered pixel are 8, 32 and 0, respectively, the size relationship detecting section outputs OR="H", ER="L", OG="L", EG="H", OB="H" and EB="L".

Figure 21:
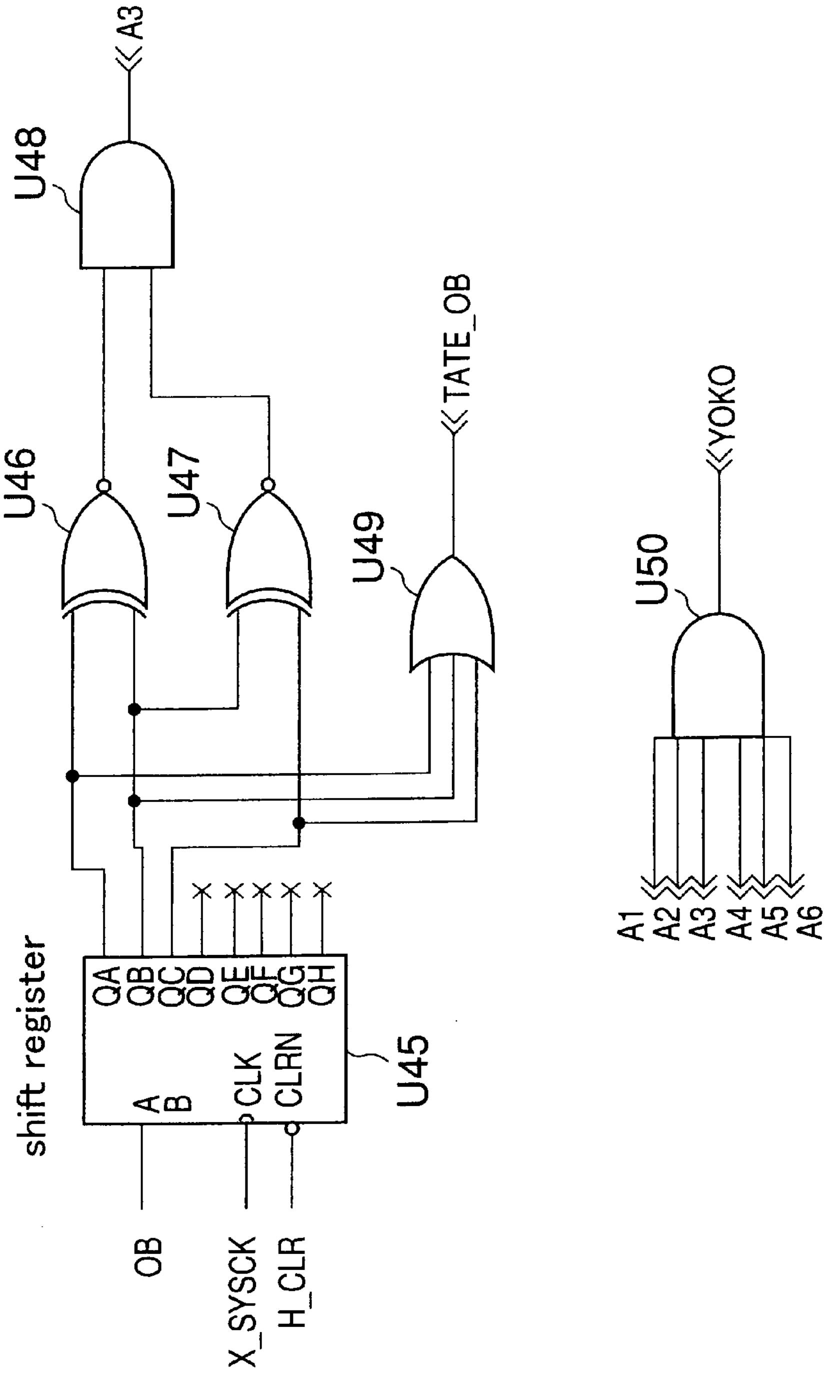
FIG. 21 is a circuit diagram of a portion of the same pattern of a size relationship detecting section.

(iii) Same Pattern of a Size Relationship Detecting Section and Horizontal Pattern Counting Section FIGS. 21 to 24 are circuit diagrams showing the constitutions of the same pattern of a size relationship detecting section 43 and the horizontal pattern counting section 44. However, although FIG. 21 shows only a circuit for detecting the pattern of the B image data of an odd-numbered pixel, actually, a circuit for detecting the pattern of the R image data of the odd-numbered pixel, a circuit for detecting the pattern of the G image data of the odd-numbered pixel, a circuit for detecting the pattern of the B image data of an even-numbered pixel, a circuit for detecting the pattern of the R image data of the even-numbered pixel and a circuit for detecting the pattern of the G image data of the even-numbered pixel are also incorporated.

The circuit shown in FIG. 21 is constituted of a shift register U45, XNOR gates U46 and U47, and an AND gate U48. The shift register U45 receives the signal OB outputted from the circuit shown in FIG. 19.

The shift register U45 shifts the signal OB at the timing synchronized with the signal X_SYSCK. This signal X_SYSCK is a signal synchronized with the timing of outputting image data. Further, the shift register U45 is cleared by the signal H_CLR synchronized with the horizontal synchronizing signal H-sync.

The XNOR gate U46 outputs "L" when one of the signals outputted from the first bit (OA) and the second bit (OB) of the shift register U45 is "H" and the other is "L" and outputs "H" when the logic values of the signals outputted from the first bit (OA) and the second bit (OB) are the same. Further, the XNOR gate U47 outputs "L" when one of the signals outputted from the second bit (OB) and the third bit (OC) of the shift register U45 is "H" and the other is "L" and outputs "H" when the logic values of the signals outputted from the second bit (OB) and the third bit (OC) are the same. The AND gate U48 outputs a signal A3 which becomes "H" when the outputs from the XNOR gates U46 and U47 are both "H" and becomes "L" in other cases.

That is, the output signal A3 from the AND gate U48 becomes "H" when the values of the signal OB outputted from the circuit shown in FIG. 19 are the same three times continuously.

By similar circuits, these signals are generated; a signal A1 that becomes "H" when the values of the signal OR, which become "H" when the R image data of the odd-numbered pixel is larger than the R image data of the even-numbered pixel, are the same three times continuously, a signal A2 that becomes "H" when the values of the signal OG, which become "H" when the G image data of the odd-numbered pixel is larger than the G image data of the even-numbered pixel, are the same three times continuously, a signal A4 that becomes "H" when the values of the signal ER, which become "H" when the R image data of the even-numbered pixel is larger than the R image data of the odd-numbered pixel, are the same three times continuously, a signal A5 that becomes "H" when the values of the signal EG, which become "H" when the G image data of the even-numbered pixel is larger than the G image data of the odd-numbered pixel, are the same three times continuously, and a signal A6 that becomes "H" when the values of the signal EB, which become "H" when the B image data of the even-numbered pixel is larger than the B image data of the odd-numbered pixel, are the same three times continuously.

The AND gate U50 outputs a signal YOKO that becomes "H" when these signals A1 to A6 are all "H". This signal YOKO, as shown in FIG. 14, becomes "H" when the same size relationships between the image data of R, G and B of two pixels adjacent in the horizontal direction repeat three times continuously.

The OR gate U49 outputs a signal TATE_OB which becomes "H" when at least one of the outputs from the first to third bits of the shift register U45 is "H" and becomes "L" when all these outputs are "L". Further, signals TATE_OR, TATE_OG, TATE_ER, TATE_EG and TATE_TB are generated by similar circuits. These signals are used in the vertical flicker pattern detecting section 46.

Figure 22:
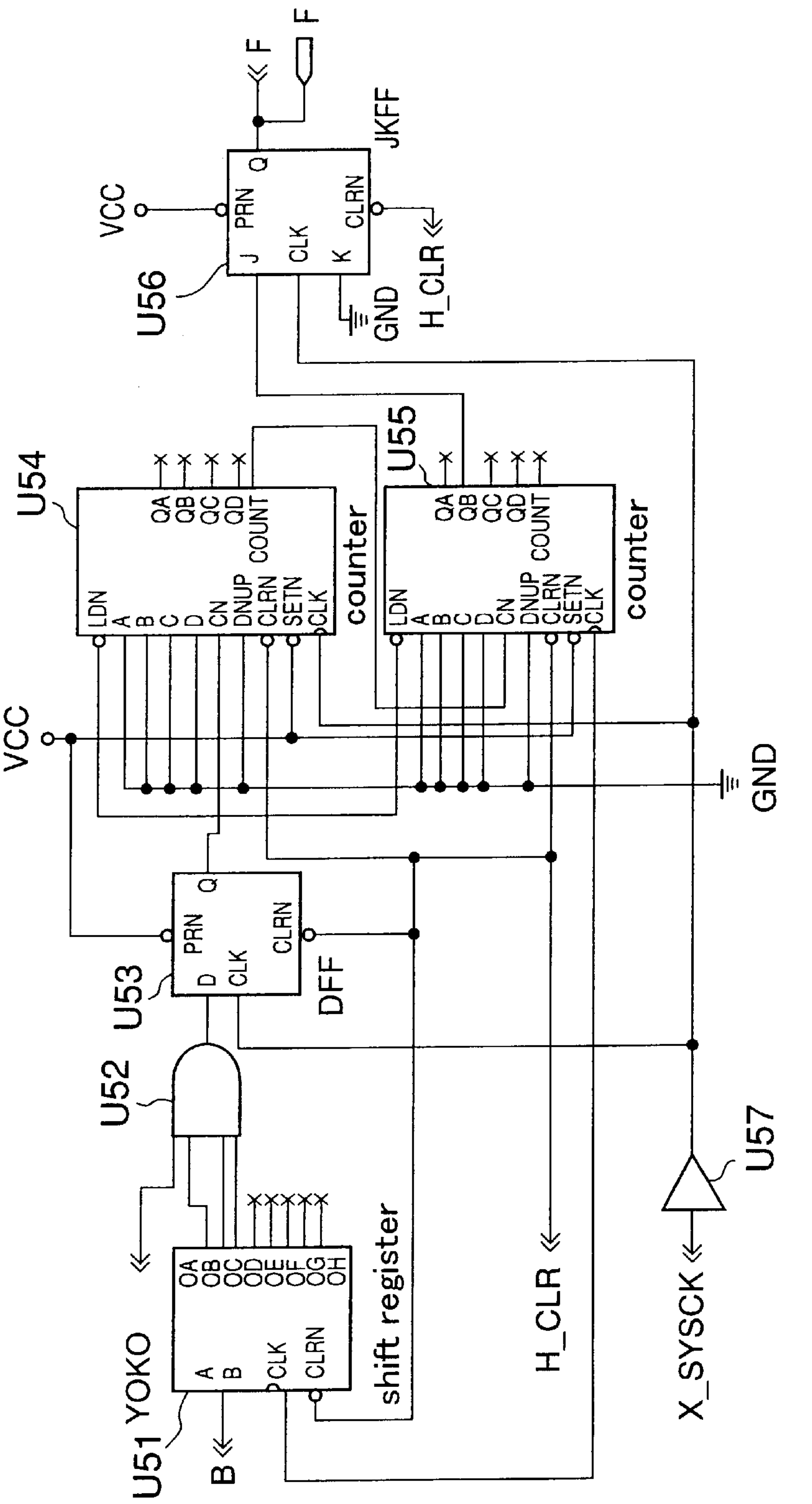
FIG. 22 is a circuit diagram of a portion of the same pattern of a size relationship detecting section and a portion of the horizontal pattern counting section.

The circuit shown in FIG. 22 is constituted of a shift register U51, an AND gate U52, a D flip-flop U53, counters U54, U55, a JK flip-flop U56, and a buffer U57. The buffer U57 supplies signals X_SYSCK to the shift register U51, the D flip-flop U53, the counters U54, U55 and the JK flip-flop U56 as clock signals. Further, the shift register U51, the D flip-flop U53, the counters U54, U55 and the JK flip-flop U56 are cleared by signals H_CLR.

The shift register U51 receives the signal B outputted from the AND gate U22 shown in FIG. 19 and shifts data at the timing synchronized with the signal X_SYSCK. The AND gate U52 receives the signal YOKO outputted from the AND gate U50 of FIG. 21 and the outputs (OA, OB and OC) from the first to third bits of the shift register U51, and it outputs "H" when all these signals are "H" and outputs "L" in other cases. The D flip-flop U53 holds the output from the AND gate U52 at the timing synchronized with the signal X_SYSCK. The counters U54 and U55 count the output from the D flip-flop U53 at the timing synchronized with the signal X_SYSCK.

The JK flip-flop U56 takes in and holds the output from the second bit (OB) of the counter U55 at the timing synchronized with the signal X_SYSCK and outputs the output as an output signal F. The output signal F is a signal which becomes "H" when the number of flicker patterns in one line is 32.

Figure 23:
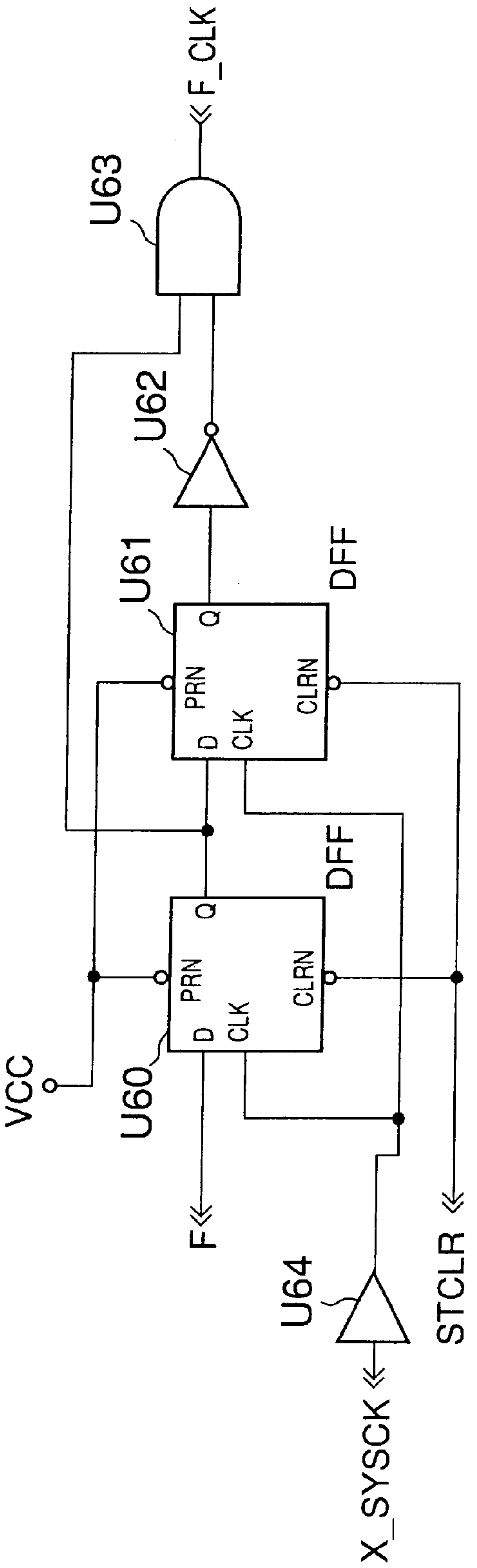
FIG. 23 is a circuit diagram of a portion of the horizontal pattern counting section.

The circuit shown in FIG. 23 is constituted of D flip-flops U60, U61, an inverter U62, an AND gate U63 and a buffer U64. The D flip-flop U60 takes in and holds the signal F outputted from the JK flip-flop U56 at the timing synchronized with the signal X_SYSCK. The D flip-flop U61 holds the output from the D flip-flop U60 at the timing synchronized with the signal X_SYSCK. The signals X_SYSCK are supplied to the D flip-flops U60 and U61 via the buffer U64.

The AND gate U63 outputs a signal F_CLK that becomes "H" when the output from the D flip-flop U60 and the output from the D flip-flop U61 which has been inverted by the inverter U62 are both "H", and becomes "L" in other cases. Note that the D flip-flops U61 and U62 are cleared by a signal STCLR. This signal STCLR is a signal that becomes "L" for only a predetermined period of time at the time of turning the power on or resetting the system.

Figure 24:
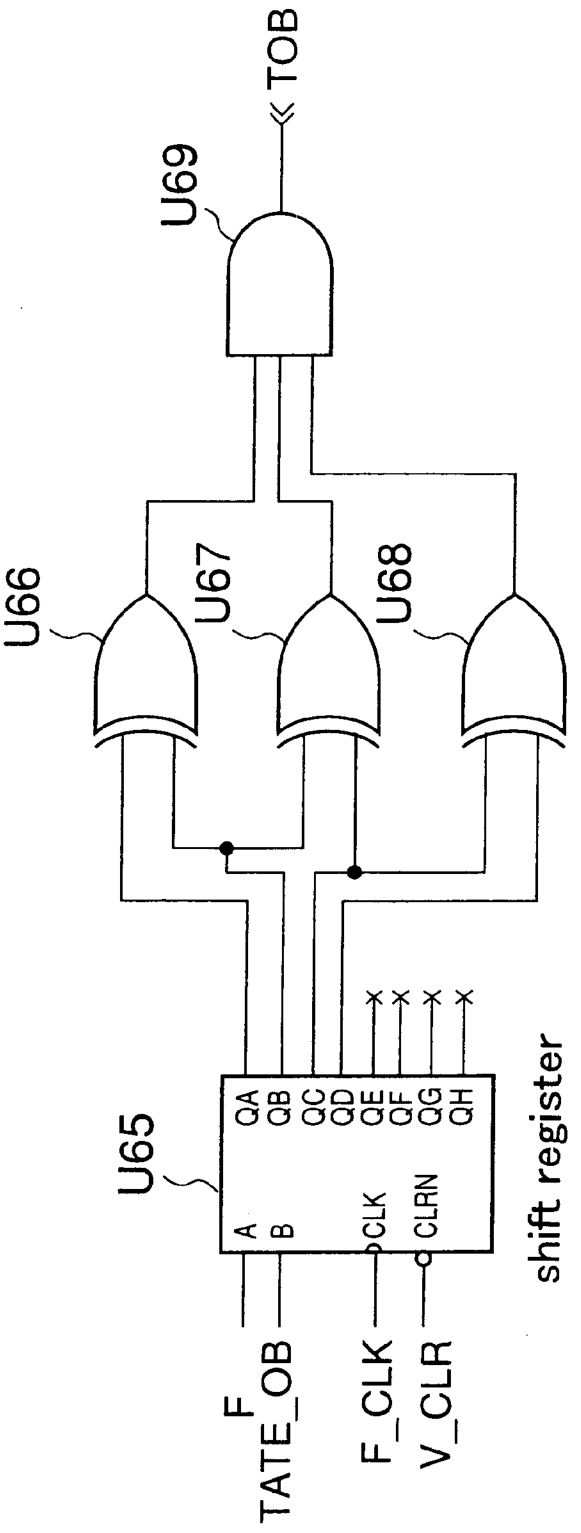
FIG. 24 is a circuit diagram of the horizontal pattern information storing section and the vertical pattern comparing section.

(iv) Horizontal Pattern Information Storing Section and Vertical Pattern Comparing Section FIG. 24 is a circuit diagram showing the constitution of the vertical pattern comparing section 47.

This circuit comprises a shift register U65, XOR gates U66, U67 and U68, and an AND gate U69.

The shift register U65 shifts the signal TATE_OB outputted from the OR gate 49 shown in FIG. 21 at the timing synchronized with the signal F_CLK outputted from the circuit shown in FIG. 23. Further, the shift register U65 is cleared by the signal V_CLR synchronized with the vertical synchronizing signal. Horizontal pattern information is stored in the shift register U65 at the timing synchronized with the signal F_CLK.

The XOR gate U66 outputs "H" when one of the outputs from the first bit (OA) and the second bit (OB) of the shift register U65 is "H" and the other is "L" and outputs "L" when the outputs from the first bit (OA) and the second bit (OB) are the same. The XOR gate U67 outputs "H" when one of the outputs from the second bit (OB) and the third bit (OC) of the shift register U65 is "H" and the other is "L" and outputs "L" when the outputs from the second bit (OB) and the third bit (OC) are the same. The XOR gate U68 outputs "H" when one of the outputs from the third bit (OC) and the fourth bit (OD) of the shift register U65 is "H" and the other is "L" and outputs "L" when the outputs from the third bit (OC) and the fourth bit (OD) are the same.

The AND gate U69 outputs a signal TOB which becomes "H" when the outputs from the XOR gates U66, U67 and U68 are all "H" and becomes "L" in other cases.

This signal TOB becomes "H" when the value of the signal TATE_OB is inverted alternately for four TATE_OB signals (for four consecutive lines). Thereby, a vertical one-dot inverted pattern corresponding to the B image data of the odd-numbered pixel is detected.

By similar circuits, these signals are generated; a signal TOR for detecting a vertical one-dot inverted pattern corresponding to the R image data of the odd-numbered pixel, a signal TOG for detecting a vertical one-dot inverted pattern corresponding to the G image data of the odd-numbered pixel, a signal TOB for detecting a vertical one-dot inverted pattern corresponding to the B image data of the odd-numbered pixel, a signal TER for detecting a vertical one-dot inverted pattern corresponding to the R image data of the even-numbered pixel, and a signal TEG for detecting a vertical one-dot inverted pattern corresponding to the G image data of the even-numbered pixel.

(v) Vertical Pattern Counting Section

Figure 25:
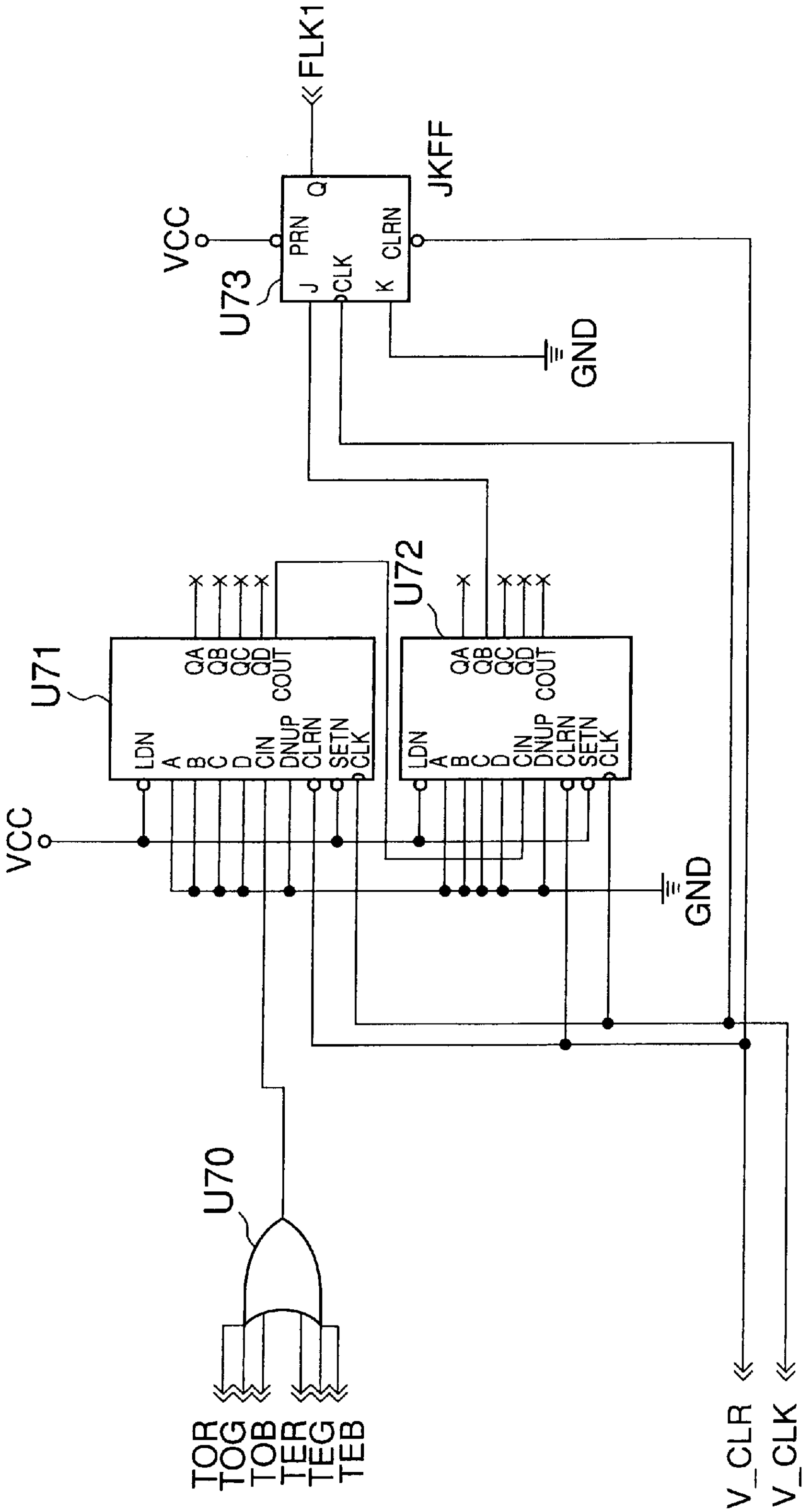
FIG. 25 is a circuit diagram of the vertical pattern counting section.

FIG. 25 is a circuit diagram showing the constitution of the vertical pattern counting section 48. The circuit is constituted of an OR gate U70, counters U71, U72, and a JK flip-flop circuit U73. The OR gate U70 receives the signals TOR, TOG, TOB, TER, TEG and TEB outputted from the circuit of FIG. 23 and circuits similar to the circuit. The OR gate U70 outputs "H" when at least one of these signals is "H" and outputs "L" when these signals are all "L".

The counters U71 and U72 count the signal outputted from the OR gate U70 at the timing synchronized with a signal V_CLK, and the signal outputted from the second bit of the counter U72 is inputted to the JK flip-flop circuit U73. The JK flip-flop circuit U73 takes in and holds the output from the counter U72 at the timing synchronized with the signal V_CLK and outputs the output as a polarity pattern switching signal FLK1.

This signal FLK1 outputted from the JK flip-flop U73 becomes "H" when the number of flicker patterns in the vertical direction is at least 32.

The drive-switching judging section 49 monitors a change in the signal FLK1 over a plurality of frames and determines the logic value of a polarity pattern switching signal FLK based on the result of monitoring. That is, the drive-switching judging section 49 sets the polarity pattern switching signal FLK to be "H" when the signal FLK1s outputted from the vertical flicker pattern detecting section 46 are "H" over a plurality of frames (for example, 8 frames), and to be "L" when the signal FLK1s are "L" over a plurality of frames.

(4) Constitution of Data Driver

Figure 26:
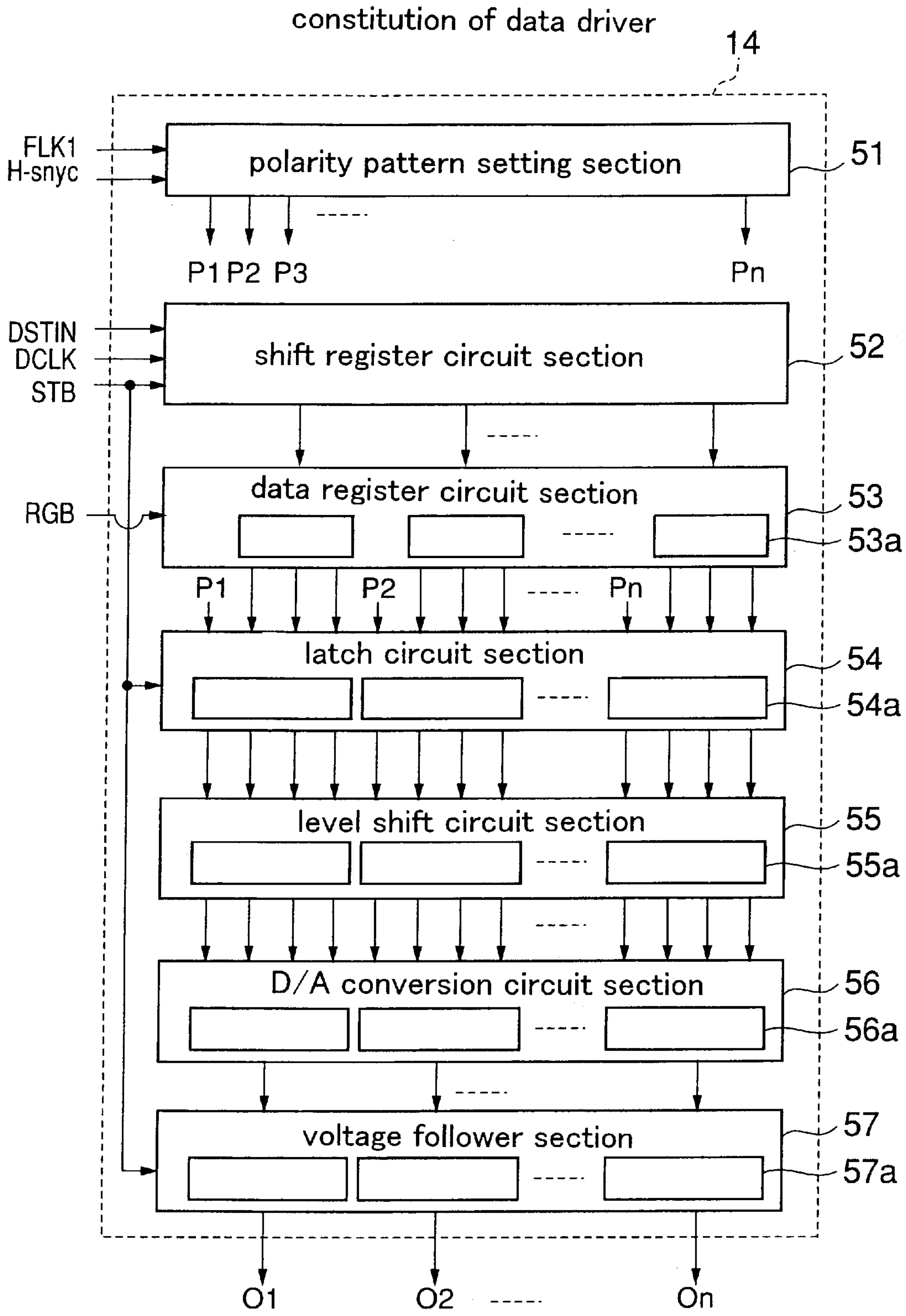
FIG. 26 is a block diagram showing the constitution of the data driver.

FIG. 26 is a block diagram showing an example of the data driver 14.

The data driver 14 is constituted of a polarity pattern setting section 51, a shift register circuit section 52, a data register circuit section 53, a latch circuit section 54, a level shift circuit section 55, a D/A conversion circuit section 56, and a voltage follower section 57.

The polarity pattern setting section 51 outputs polarity signals P1 to Pn according to the polarity pattern switching signal FLK outputted from the drive-switching judging section 49 at the timing synchronized with the horizontal synchronizing signal H-sync. That is, when the polarity pattern switching signal FLK is "L", the polarity pattern setting section 51 inverts the logic values of the polarity signals P1 to Pn for every horizontal synchronizing period to generate the vertical one-line inverted polarity pattern shown in FIG. 3(*a*), while when the polarity pattern switching signal FLK is "H", the polarity pattern setting section 51 inverts the logic values of the polarity signals P1 to Pn for every two horizontal synchronizing periods to generate the vertical two-line inverted polarity pattern shown in FIG. 3(*b*).

The data register circuit section 53 is constituted of an n number of registers 53*a*. The shift register circuit section 52 receives the data start signal DSTIN, the data clock DCLK and a strobe signal STB and sets the addresses of the registers 53*a* in the data register circuit section 53. That is, when inputted with the data start signal DSTIN, the shift register circuit section 52 sets the first address of the register 53*a* and increments the address in synchronization with the data clock DCLK. The data register circuit section 53 receives the image signal RGB and stores R image data, G image data or B image data in the register 53*a* at the address specified by the shift register circuit section 52.

The latch circuit section 54 is constituted of an n number of latch circuits 54*a*. Each latch circuit 54*a* latches the outputs from the data register circuit section 53 and the outputs from the shift register circuit section 51 in synchronization with the strobe signal STB. At this point, each latch circuit 54*a* adds the polarity signals P1 to Pn to the highest bits of R image data, G image data or B image data.

The level shift circuit section 55 changes the level of the signal outputted from the latch circuit section 54. For example, the level shift circuit section 55 converts a signal having a peak value of, for example, 3.3 V, which is outputted from the latch circuit section 54, to a signal having a peak value of, for example, 12 V and outputs the signal to the D/A conversion circuit section 56.

The D/A conversion circuit section 56 is constituted of an n number of D/A converters 56*a*. The D/A converters 56*a* receives the R image data, G image data and B image data to which the polarity signals P1 to Pn have been added, and output analog image data O1 to On of positive polarity (+) or negative polarity (−) depending on whether the logic values of the highest bits are "H" or "L". The voltage follower section 57 is constituted of an n number of voltage followers 57*a*. The voltage followers 57*a* supply the image data O1 to On outputted from the D/A conversion circuit section 56 to each data bus line 23 of the liquid crystal display panel 13 in synchronization with the strobe signal STB (refer to FIG. 10).

In the present embodiment, as described above, the image data of two adjacent pixels are compared with each other, flicker patterns in horizontal and vertical directions are detected, and when at least a certain number of flicker patterns exist and this spreads over a plurality of frames, a polarity pattern is switched to another. Thereby, the occurrence of a flicker can be prevented. Further, since the polarity pattern is not switched unnecessarily, a reduction in display quality caused by the unnecessarily frequent switching of the polarity pattern can be avoided.

In the above embodiment, there has been described the case where a one-line inverted polarity pattern is used as the first polarity pattern and a two-line inverted polarity pattern is used as the second polarity pattern. However, this does not limit the first polarity pattern and the second polarity pattern to the one-line inverted polarity pattern and the two-line inverted polarity pattern, respectively.

(Second Embodiment)

A description will be given to the second embodiment of the present invention below. Note that the present embodiment is different from the first embodiment in that the constitutions of the gradation difference judging section 41 and the size relationship detecting section 42 of the present embodiment are different from those of the first embodiment, and other constitutions are basically the same as those of the first embodiment. Therefore, a description will be omitted what has been already described. Further, the present embodiment will also be described with reference to FIG. 11.

In the first embodiment, image data are classified into eight groups according to the values of the image data as shown in FIG. 13, and gradation difference is judged based on these groups. Incidentally, in the present embodiment, gradation difference is judged on the basis of whether the image data of an odd-numbered pixel differs from the image data of an even-numbered pixel by 9 or more steps of gradation.

Figure 27:
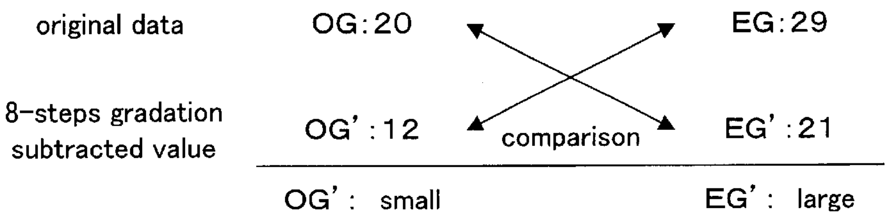
FIG. 27 is a diagram showing the method for detecting a 9-step gradation difference (second embodiment).

For example, it is assumed that the gradation of the G image data OG of the odd-numbered pixel is 20 and the gradation of the G image data EG of the even-numbered pixel is 29 as shown in FIG. 27. In this case, a value OG' (12) obtained by subtracting 8 (steps of gradation) from the value of OG is compared with the value (29) of EG, while a value EG' (21) obtained by subtracting 8 (steps of gradation) from the value of EG is compared with the value (20) of OG. As a result, when the value of OG' is smaller than the value of EG and the value of EG' is larger than the value of OG, this indicates that the value of EG is larger than the value of OG by 9 or more steps of gradation. Further, when the value of OG' is larger than the value of EG and the value of EG' is smaller than the value of OG, this indicates that the value of OG is larger than the value of EG by 9 or more steps of gradation. Further, when the value of OG' is smaller than the value of EG and the value of EG' is smaller than the value of OG, this indicates that the gradation difference between the values of OG and EG is smaller than 9 steps of gradation. Note that it never occurs that the value of OG' is larger than the value of EG and the value of EG' is larger than the value of OG.

Figure 28:
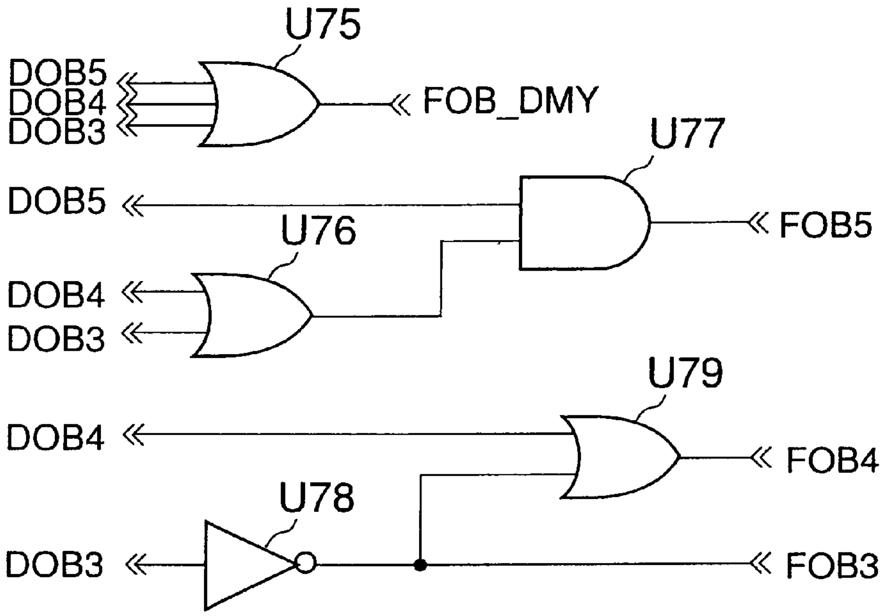
FIG. 28 is a circuit diagram showing the 8-step gradation difference subtraction circuit.

FIG. 28 is a circuit diagram showing the 8-step gradation subtraction circuit of the gradation difference judging section 41 of the liquid crystal display device of the present embodiment. Although FIG. 28 shows only the circuit for subtracting 8 steps of gradation from the value of the B image data of an odd-numbered bit, the gradation difference judging section 41 of the present embodiment also comprises a circuit for subtracting 8 steps of gradation from the value of the R image data of the odd-numbered bit, a circuit for subtracting 8 steps of gradation from the value of the G image data of the odd-numbered bit, a circuit for subtracting 8 steps of gradation from the value of the B image data of an even-numbered bit, a circuit for subtracting 8 steps of gradation from the value of the R image data of the even-numbered bit, and a circuit for subtracting 8 steps of gradation from the value of the G image data of the even-numbered bit.

This circuit is constituted of OR gates U75, U76, an AND gate U77, an inverter U78, and an XOR gate U79. The OR gate U75 receives the fifth bit (DOB5), fourth bit (DOB4) and third bit (DOB3) of the B image data of an odd-numbered pixel and outputs a signal FOB_DMY that becomes "H" when at least one of these bits is "H" and becomes "L" when all these bits are "L".

The OR gate U76 receives the B image data (DOB4) of the fourth bit of the odd-numbered pixel and the B image data (DOB3) of the third bit thereof, and it outputs "H" when at least one of these bits is "H" and outputs "L" when these bits are both "L". The AND gate U77 receives the fifth bit of the B image data of the odd-numbered pixel and the output from the OR gate U76 and outputs a signal FOB5 that becomes "H" when both of these are "H" and becomes "L" in other cases.

The inverter U78 inverts the value of the third bit of the B image data of the odd-numbered pixel and outputs the inverted value as a signal FOB3. The XOR gate U79 outputs a signal FOB4 that becomes "H" when one of the output from the inverter U78 and the fourth bit of the B image data of the odd-numbered pixel is "H" and the other is "L" and becomes "L" when the logic values of these are both "L".

The signals FOB5, FOB4 and FOB3 outputted from this 8-step gradation subtraction section are set to be the three highmost bits, and by combining these with the three lowmost bits of the original B image data, a value which is smaller than the original B image data by 8 steps of gradation can be obtained.

By similar circuits, there can be obtained a value which is smaller than the R image data of the odd-numbered pixel by 8 steps of gradation, a value which is smaller than the G image data of the odd-numbered pixel by 8 steps of gradation, a value which is smaller than the B image data of the even-numbered pixel by 8 steps of gradation, a value which is smaller than the R image data of the even-numbered pixel by 8 steps of gradation, and a value which is smaller than the G image data of the even-numbered pixel by 8 steps of gradation. These values are compared with the original image data to judge whether 9 or more steps of gradation difference exist or not, and the result of the judgment is outputted to the same pattern of a size relationship detecting section 43.

Figure 29:
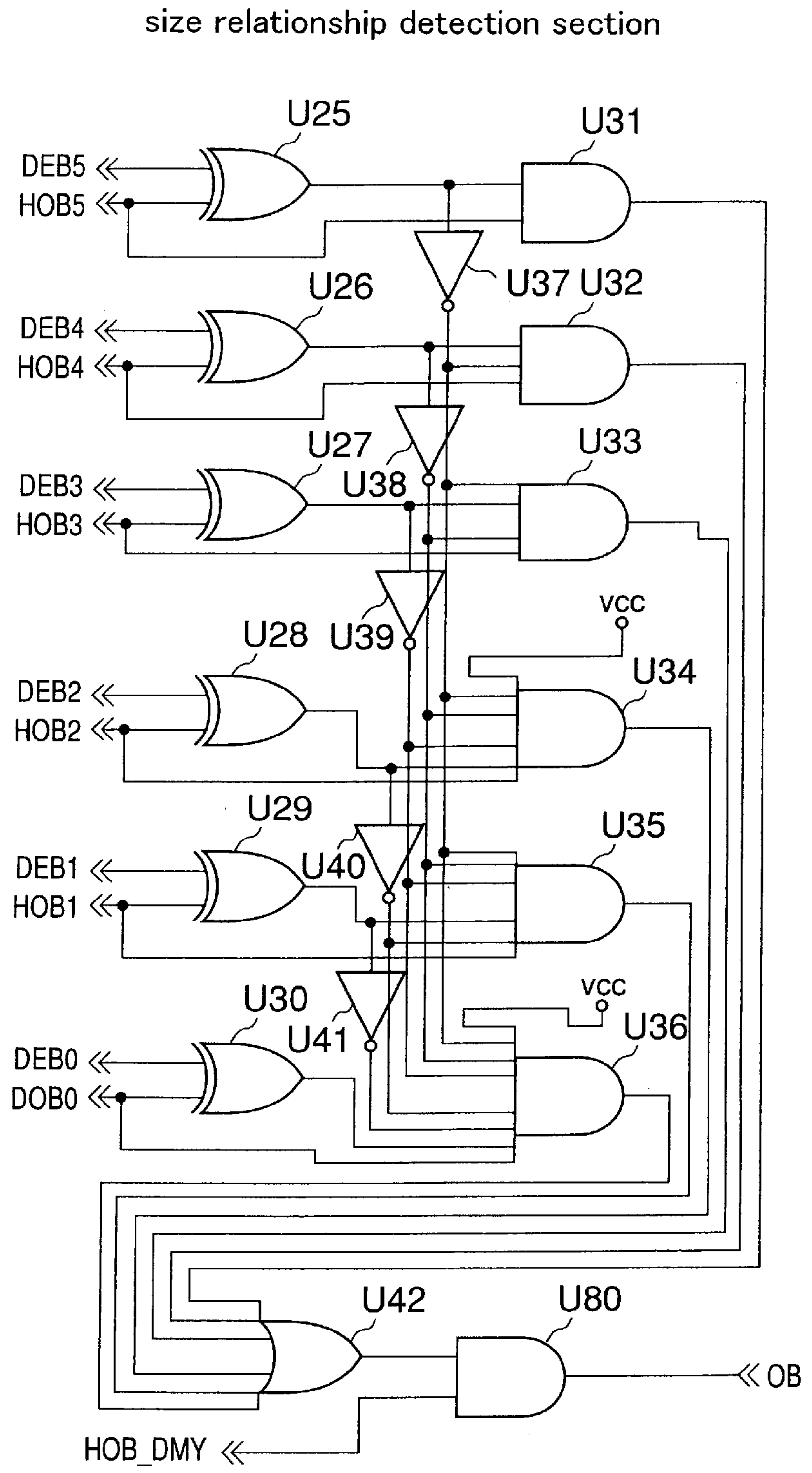
FIG. 29 is a circuit diagram showing the size relationship detecting section.

FIG. 29 is a circuit diagram showing the constitution of the same pattern of a size relationship detecting section 42 of the present embodiment. The components shown in FIG. 29 which are the same as those shown in FIG. 19 are named and numbered in the same manner as in FIG. 19. Further, in FIG. 29, HOB5, HOB4, HOB3, HOB2 and HOB1 represent the fifth to first bits of the odd-numbered pixel after the 8-bit subtraction, respectively.

This circuit detects the size relationship between the B image data of the odd-numbered pixel after the 8-bit subtraction and the original B image data of the even-numbered pixel. And hence, the AND gate U80 outputs a signal OB which becomes "H" when the B image data of the odd-numbered pixel after the 8-bit subtraction is larger than the original B image data of the even-numbered pixel and becomes "L" in other cases.

By similar circuits, these signals are generated; a signal OR which becomes "H" when the R image data of the odd-numbered pixel after the 8-bit subtraction is larger than the original R image data of the even-numbered pixel, a signal OG which becomes "H" when the G image data of the odd-numbered pixel after the 8-bit subtraction is larger than the original G image data of the even-numbered pixel, a signal EB which becomes "H" when the B image data of the even-numbered pixel after the 8-bit subtraction is larger than the original B image data of the odd-numbered pixel, a signal ER which becomes "H" when the R image data of the even-numbered pixel after the 8-bit subtraction is larger than the original R image data of the odd-numbered pixel, and a signal EG which becomes "H" when the G image data of the even-numbered pixel after the 8-bit subtraction is larger than the original G image data of the odd-numbered pixel.

In the first embodiment, since the gradation difference is detected by classifying gradations into groups, even if it is judged that the gradation difference exists, it varies from 8 to 15. In comparison with that, in the present embodiment, a gradation difference having a size of 8 or more steps of gradation is detected. Therefore, more specific judgment can be made.

(Third Embodiment)

A description will be given to the third embodiment of the present invention below.

In the first embodiment, the same gradation difference condition (that is, when the difference is two or more groups) is applied to when the first polarity pattern is switched to the second polarity pattern and when the second polarity pattern is switched to the first polarity pattern. Incidentally, in the present embodiment, the so-called "hysteresis" characteristics are realized by setting the gradation difference when the first polarity pattern is switched to the second polarity pattern to be 9 or more steps of gradation and the gradation difference when the second polarity pattern is switched to the first polarity pattern to be 6 or more steps of gradation.

Therefore, in the present embodiment, it is necessary to perform an 8-step gradation subtraction and a 6-step gradation subtraction. As an 8-step gradation subtraction circuit, the circuit shown in FIG. 28 can be used.

Figure 30:
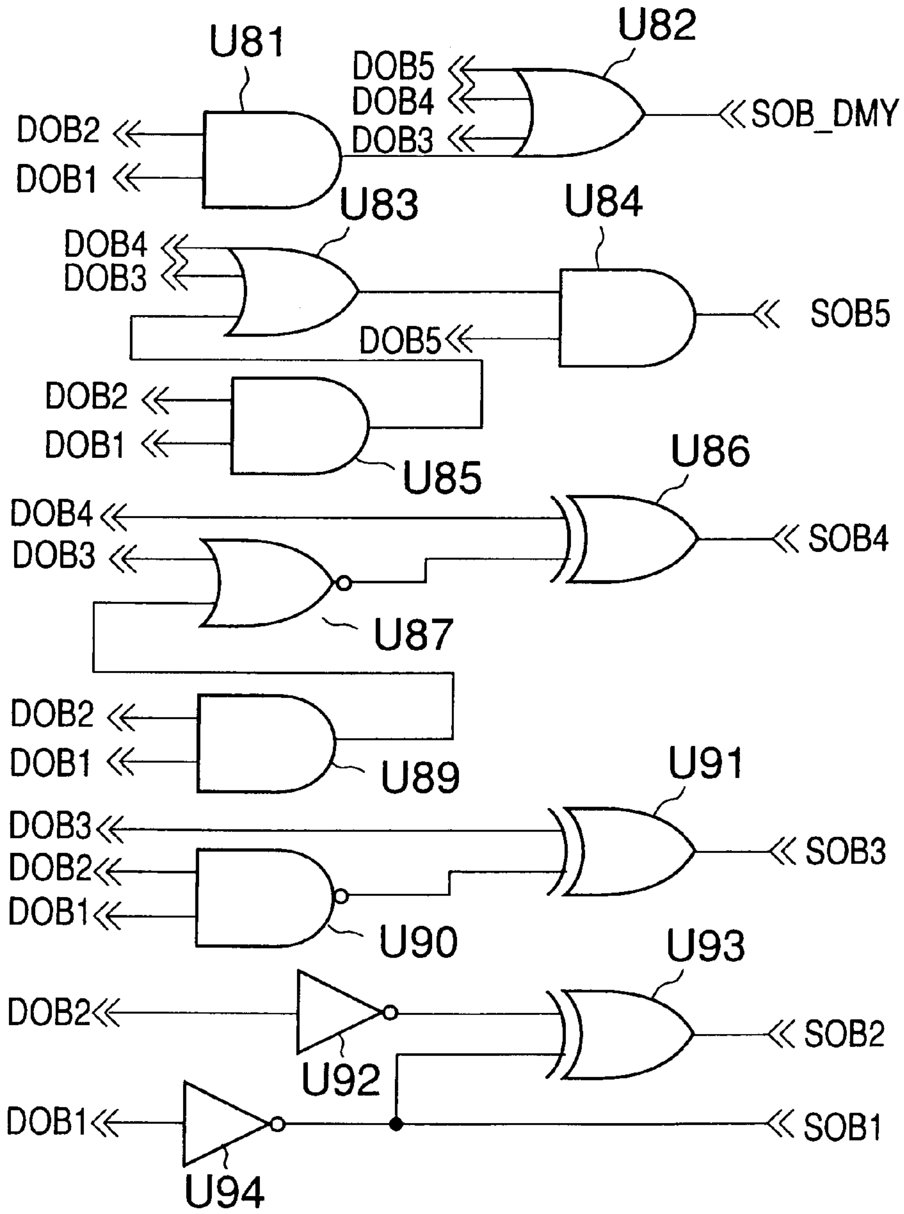
FIG. 30 is a circuit diagram showing the 6-step gradation subtraction circuit (third embodiment).

FIG. 30 is a circuit diagram showing a 6-step gradation subtraction circuit. The circuit is constituted of AND gates U81, U84, U85 and U89, OR gates U82 and U83, XOR gates U86, U91 and U93, an NOR gate U87, an NAND gate U90, and inverters U92 and U94.

The AND gate U81 receives the second bit (DOB2) and first bit (DOB1) of the B image data of an odd-numbered pixel. The AND gate U81 outputs "H" when these bits are both "H" and outputs "L" in other cases. The OR gate U82 receives the output from the AND gate U81 and the fifth bit (DOB5), fourth bit (DOB4) and third bit (DOB3) of the B image data of the odd-numbered pixel and outputs a signal SOB_DMY which becomes "H" when at least one of these is "H" and becomes "L" when these are all "L".

The AND gate U85 receives the second bit (DOB2) and first bit (DOB1) of the B image data of an odd-numbered pixel, and it outputs "H" when these bits are both "H" and outputs "L" in other cases. The OR gate U83 receives the output from the AND gate U85 and the fourth bit (DOB4) and third bit (DOB3) of the B image data of the odd-numbered pixel, and it outputs "H" when at least one of these is "H" and outputs "L" when these are all "L". The AND gate U84 receives the output from the OR gate U83 and the fifth bit (DOB5) of the B image data of the odd-numbered pixel and outputs a signal SOB5 which becomes "H" when these are both "H" and the value "L" in other cases.

The AND gate U89 receives the second bit (DOB2) and first bit (DOB1) of the B image data of the odd-numbered pixel, and it outputs "H" when these bits are both "H" and outputs "L" in other cases. The NOR gate U87 receives the output from the AND gate U89 and the third bit (DOB3) of the B image data of the odd-numbered pixel, and it outputs "L" when at least one of these is "H" and outputs "L" when these are both "H". The NOR gate U86 receives the output from the NOR gate U87 and the fourth bit (DOB4) of the B image data of the odd-numbered pixel and outputs a signal SOB4 which becomes "H" when one of these is "H" and the other is "L" and becomes "L" when these are both "H" or "L".

The NOR gate U90 receives the second bit (DOB2) and first bit (DOB1) of the B image data of the odd-numbered pixel, and it outputs "L" when these bits are both "H" and outputs "H" in other cases. The XOR gate U91 receives the output from the NAND gate U90 and the third bit (DOB3) of the B image data of the odd-numbered pixel and outputs a signal SOB3 which becomes "H" when one of these is "H" and the other is "L" and becomes "L" when these are both "H" or "L".

The inverter U92 receives the second bit (DOB2) of the B image data of the odd-numbered pixel, and the inverter U94 receives the first bit (DOB1) of the B image data of the odd-numbered pixel. The XOR gate U93 receives the output from the inverter U92 and the output from the inverter U94 and outputs a signal SOB2 which becomes "H" when one of these outputs is "H" and the other is "L" and becomes "L" when these are both "H" or "L". Further, a signal outputted from the inverter U94 is outputted as a signal DOB1.

Although a description has been so far given only to the circuit for subtracting 6 steps of gradation from the B image data of the odd-numbered pixel, a circuit for subtracting 6 steps of gradation from the R image data of the odd-numbered pixel, a circuit for subtracting 6 steps of gradation from the G image data of the odd-numbered pixel, a circuit for subtracting 6 steps of gradation from the B image data of the even-numbered pixel, a circuit for subtracting 6 steps of gradation from the R image data of the even-numbered pixel and a circuit for subtracting 6 steps of gradation from the G image data of the even-numbered pixel are also incorporated.

Figure 31:
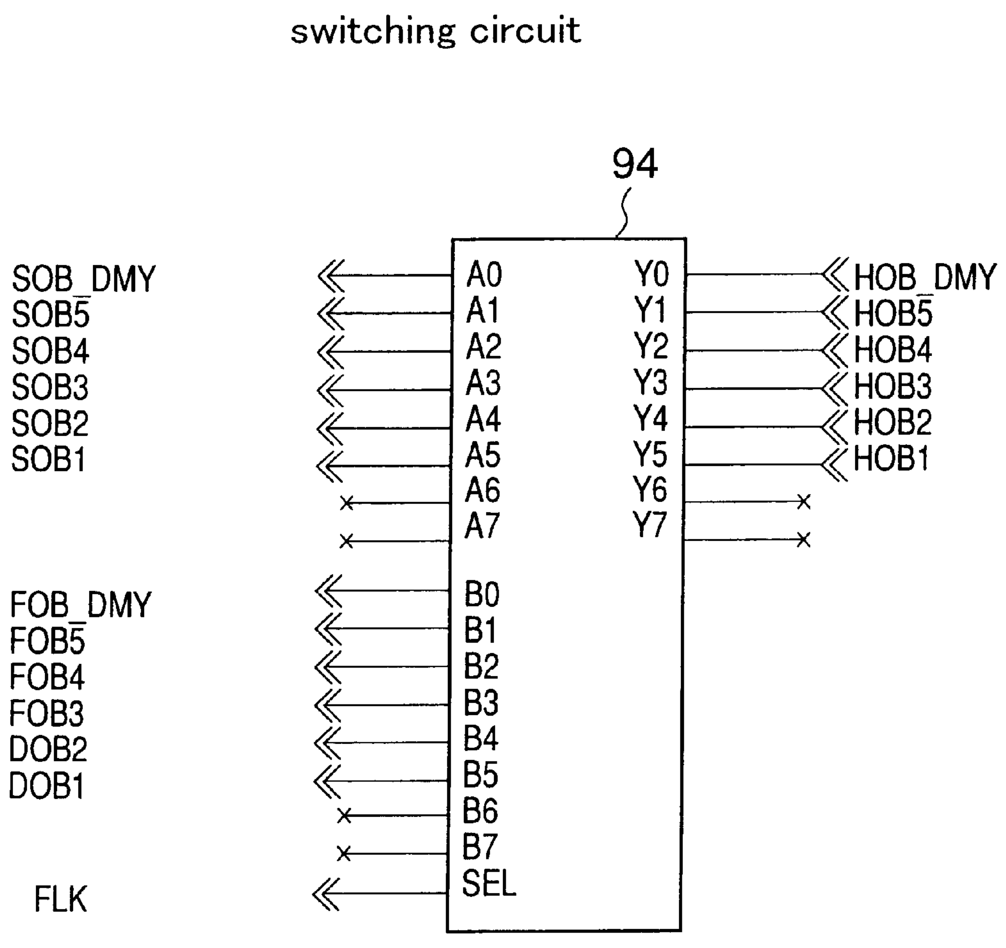
FIG. 31 is a diagram showing the switching circuit.

FIG. 31 is a diagram showing the switching circuit. This switching circuit U94 has two 8-bit input ports. The terminals A0 to A5 of one of these ports receives the outputs SOB_DMY and SOB5 to SOB1 from the 6-bit subtraction circuits, while the terminals B0 to B5 of the other port receives the outputs FOB_DMY and FOB5 to FOB1 from the 8-bit subtraction circuits. The switching circuit U94 outputs the signals inputted to the terminals B0 to B5 from the output terminals Y0 to Y5 as signals HOB_DMY and HOB5 to HOB1 when the polarity pattern switching signal FLK is "L", that is, when the liquid crystal display panel is driven with the vertical one-line inverted polarity pattern. Further, the switching circuit U94 outputs the signals inputted to the terminals A0 to A5 from the output terminals Y0 to Y5 as signals HOB_DMY and HOB5 to HOB1 when the polarity pattern switching signal FLK is "H", that is, when the liquid crystal display panel is driven with the vertical two-line inverted polarity pattern.

The signals outputted from the switching circuit 94 are inputted to the size relationship detecting circuit shown in FIG. 29.

In the present embodiment, the gradation difference is 9 or more steps of gradation when the vertical one-line inverted polarity pattern is switched to the vertical two-line inverted polarity pattern and 6 or less steps of gradation when the vertical two-line inverted polarity pattern is switched to the vertical one-line inverted polarity pattern. For example, when the vertical two-line inverted polarity pattern is switched back to the vertical one-line inverted polarity pattern with 9 or less steps of gradation difference, an 8 steps of gradation difference occur in data due to the influence of noise, whereby the polarity pattern may be changed. However, by making the gradation difference for judging the polarity pattern different from the gradation difference at the time of lifting the judgment as in the present embodiment, a malfunction caused by the influence of noise can be avoided.

(Fourth Embodiment)

Figure 32:
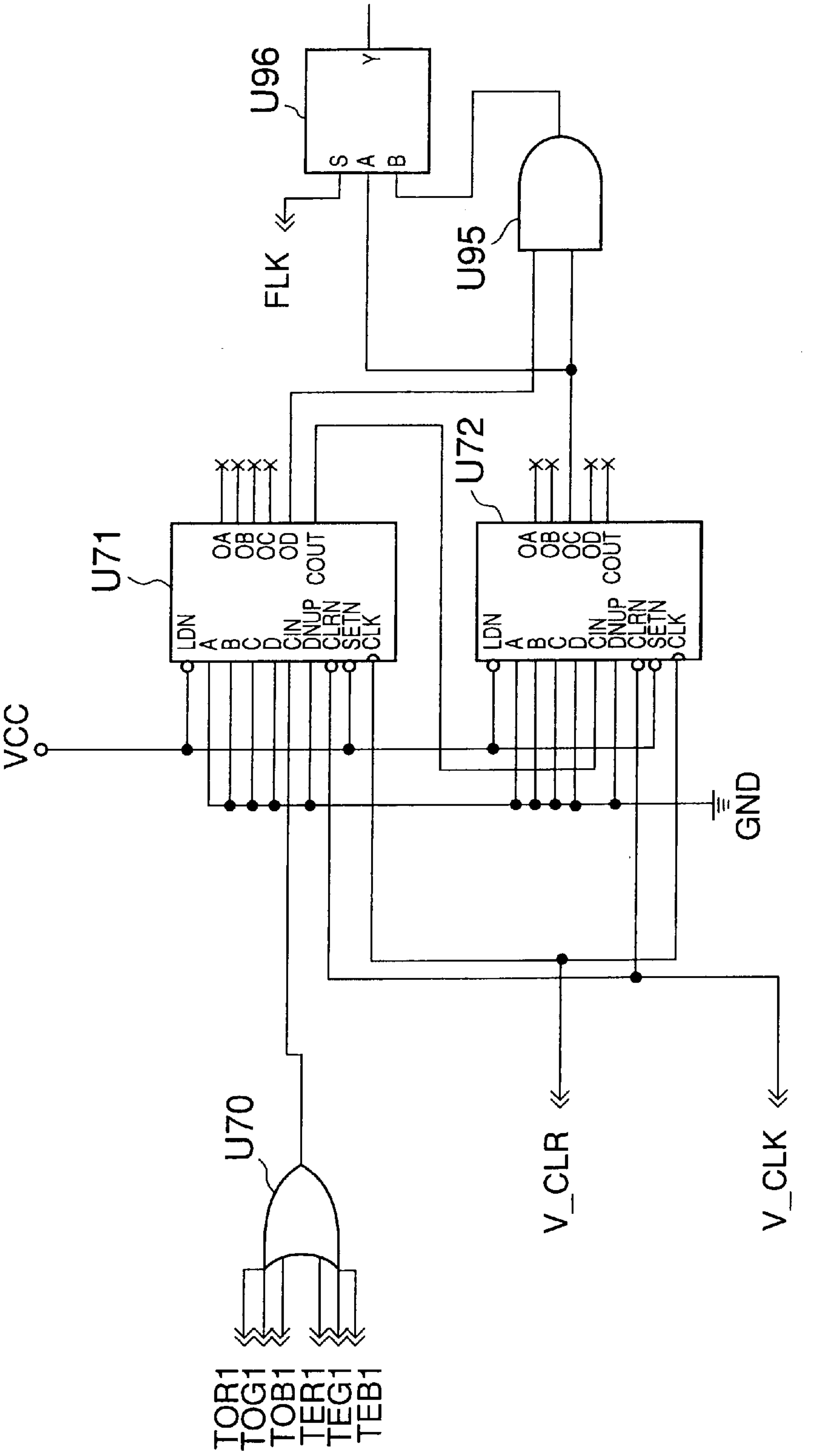
FIG. 32 is a diagram showing the constitution of the vertical pattern counting section (fourth embodiment).

FIG. 32 is a circuit diagram showing the constitution of the vertical pattern counting section of the liquid crystal display device of the fourth embodiment. The present embodiment is basically the same as the first embodiment except that the number of patterns in the vertical direction is given hysteresis. Therefore, a description will be omitted about what has been already described.

In the circuit shown in FIG. 32, an AND gate U95 is supplied with the fourth bit (QD) of the counter U71 and the third bit (QC) of the counter U72. The AND gate U95 supplies a signal which becomes "H" when these bits are both "H" and becomes "L" in other cases to the input terminal B of a switching circuit U96. Further, the input terminal A of the switching circuit U96 is supplied with the output from the third bit (QC) of the counter U72. The switching circuit U96 sends the output of the AND gate U95 to the next stage (JK flip-flop U73 of FIG. 25) when the polarity pattern switching signal FLK is "L".

In the present embodiment, the condition for initiating the judgment of a flicker is set to be 72 or more counts, and the condition for lifting the judgment of the flicker is set to be 63 or less counts. For example, when the liquid crystal display panel is driven by the vertical two-line inverted polarity pattern with the number of pattern being 72 counts and a noise prevents counting over 70, the lifting of the judgment of the flicker can be prevented since the condition for lifting the judgment of the flicker is set to be 63 or less counts in the present embodiment. Thereby, a malfunction caused by the influence of noise can be prevented.

Although the preferred embodiments of the present invention have been described in detail, it should be understood that various changes, substitutions and alternations can be made therein without departing from spirit and scope of the inventions as defined by the appended claims.

What is claimed is:

1. A liquid crystal display device, comprising:

a liquid crystal display panel supplying a voltage in which a polarity having a predetermined polarity pattern is reversed against a common voltage, to a plurality of picture elements arranged in horizontal and vertical directions;

an image data output section outputting image data;

a judging section detecting a difference in gradation between the image data supplied to picture elements of the same color of two pixels which are each respectively constituted by at least one of a red (R) picture element, a green (G) picture element, and a blue (B) picture element adjacent in a horizontal direction and outputting a polarity pattern switching signal on a basis of a result of the detection; and a polarity image data-supplying section which supplies the image data to the liquid crystal display panel with a polarity pattern which is different from the predetermined polarity pattern according to the polarity pattern switching signal.

2. The liquid crystal display device according to claim 1, wherein the judging section has a size relationship detecting section that detects the size relationship between the image data of the two pixels when the difference in gradation between the image data of picture elements of the same color of the two pixels exceeds a certain range.

3. The liquid crystal display device according to claim 2, wherein the judging section has the same pattern of a size relationship detecting section which detects whether the size relationship that has been detected by the size relationship detecting section repeats in one line at least a certain number of times or not.

4. The liquid crystal display device according to claim 3, wherein the judging section has a horizontal size relationship storing section which stores the size relationship when the same pattern of a size relationship detecting section detects the size relationship that repeats at least a certain number of times.

5. The liquid crystal display device according to claim 4, wherein the judging section has a polarity pattern switching signal output section which compares the size relationship stored in the size relationship storing section with those in a plurality of lines continuously arranged in the vertical direction and outputs the polarity pattern switching signal based on the results of the comparisons.

6. The liquid crystal display device according to claim 5, wherein in the judging section, the threshold of the difference in gradation between the image data when the polarity pattern switching signal is changed is different from the threshold of the difference in gradation between the image data when the polarity pattern switching signal is restored.

7. The liquid crystal display device according to claim 5, wherein in the judging section, the threshold of the number of lines between which the size relationship is inverted is different from the threshold of the number of lines when the polarity pattern switching signal is restored.

8. A method for driving a liquid crystal display device, comprising the steps of:

supplying a voltage in which a polarity having a first polarity pattern is reversed against a common voltage as an image data to a plurality of picture elements arranged in horizontal and vertical directions of the liquid crystal display device;

judging whether a difference in gradation between the image data of picture elements of a same color of two pixels which are each respectively constituted by at least one of a red (R) picture element, a green (G) picture element, and a blue (B) picture element adjacent in the horizontal direction exceeds a certain range;

examining the size relationship between the image data of the two pixels when the difference exceeds the certain range and judging whether the same size relationship pattern repeats in one line at least a certain number of times or not;

storing the size relationship when it is judged that the same size relationship pattern repeats at least a certain number of times;

detecting the size relationships of a plurality of lines continuously arranged in the vertical direction and counting the number of lines between which the size relationship is inverted alternately out of the plurality of lines; and switching the polarity of the image data supplied to each picture element of the liquid crystal display device to the polarity determined by the second polarity pattern based on the result of judging.

9. The method for driving the liquid crystal display device according to claim 8, wherein the difference in gradation between the image data when the first polarity pattern is switched to the second polarity pattern is different from the difference in gradation between the image data for driving the liquid crystal display device when the second polarity pattern is switched back to the first polarity pattern.

10. The method for driving the liquid crystal display device according to claim 8, wherein the number of inversions of the size relationship when the first polarity pattern is switched to the second polarity pattern is different from the number of inversions of the size relationship when the second polarity pattern is switched back to the first polarity pattern.

11. A circuit for driving a liquid crystal display device which supplies a voltage in which a polarity having a predetermined polarity pattern is reversed against a common voltage, to a plurality of picture elements arranged in vertical and horizontal directions of a liquid crystal display panel, comprising:

an image data output section outputting image data;

a judging section detecting the difference in gradation between the image data supplied to picture elements of the same color of two pixels which are each respectively constituted by at least one of a red (R) picture element, a green (G) picture element, and a blue (B) picture element adjacent in the horizontal direction and output a polarity pattern switching signal on a basis of a result of the detection thereto; and a driver circuit supplying the image data outputted from the image data output section to the plurality of picture elements with a polarity pattern which is different from the predetermined polarity pattern according to the polarity pattern switching signal.

12. The circuit for driving the liquid crystal display device according to 11, wherein the judging section comprises:

a horizontal pattern detecting section which detects the difference in gradation between the image data of picture elements of the same color of the two pixels, detects the size relationship between the image data of the two pixels when the difference exceeds a certain range and detects the number of repetition of the same size relationship in one line, and a polarity pattern switching signal output section which compares the size relationship of one line with those of a plurality of lines continuously arranged in the vertical direction and changes the polarity pattern switching signal when the size relationship of one line is inverted alternately over the plurality of lines.

13. The circuit for driving the liquid crystal display device according to claim 11, wherein the polarity pattern switching signal output section comprises:

a vertical pattern detecting section which counts the inversions of the size relationship over the plurality of lines, and a switching judging section which changes the polarity pattern switching signal when a frame in which the size relationship is inverted at least a certain number of times repeats a plurality of times in succession.

14. The circuit for driving the liquid crystal display device according to claim 11, wherein in the judging section, the threshold of the difference in gradation between the image data when the polarity pattern switching signal is changed is different from the difference in gradation between the image data when the polarity pattern switching signal is restored.

15. The circuit for driving the liquid crystal display device according to claim 11, wherein in the judging section, the number of inversions of the size difference when the polarity pattern switching signal is changed is different from the number of inversions of the size difference when the polarity pattern switching signal is restored.

16. The liquid crystal display device according to claim 5, wherein the polarity pattern switching signal output section changes the polarity pattern switching signal when it judges that a flicker may occur over a plurality of frames.

* * * * *